United States Patent [19]

Fischer et al.

[11] Patent Number: 6,111,012
[45] Date of Patent: Aug. 29, 2000

[54] POLYMER COMPOSITIONS FOR GRAFT COPOLYMER AS WELL AS MIXTURES THEREOF AND THERMOPLASTIC COMPOUNDS CONTAINING THEM

[75] Inventors: Michael Fischer, Ludwigshafen; Jürgen Koch, Neuhofen; Bernhard Rosenau; Graham Edmund Mc Kee, both of Neustadt; Sven Grabowski, Ludwigshafen; Norbert Mosbach, Maxdorf; Wolfgang Fischer, Ludwigshafen; Walter Heckmann, Weinheim, all of Germany

[73] Assignee: BASF Aktiengesellschaft, Ludwigshafen, Germany

[21] Appl. No.: 08/981,292

[22] PCT Filed: Jun. 26, 1996

[86] PCT No.: PCT/EP96/02793

§ 371 Date: Dec. 22, 1997

§ 102(e) Date: Dec. 22, 1997

[87] PCT Pub. No.: WO97/01588

PCT Pub. Date: Jan. 16, 1997

[30] Foreign Application Priority Data

Jun. 26, 1995 [DE] Germany ............... 195 23 080
Mar. 20, 1996 [DE] Germany ............... 196 10 896
Mar. 20, 1996 [DE] Germany ............... 196 10 897

[51] Int. Cl.$^7$ .................................................. C08L 51/04
[52] U.S. Cl. ........................ 525/64; 525/67; 525/143; 525/316

[58] Field of Search ............................ 525/67, 69, 143, 525/316, 902, 71

[56] References Cited

U.S. PATENT DOCUMENTS 5,206,299  4/1993  Shime et al. ................... 525/68

FOREIGN PATENT DOCUMENTS 256 391  2/1988  European Pat. Off. .
41 32 497  9/1991  Germany .

*Primary Examiner*—James J. Seidleck
*Assistant Examiner*—Olga Asinovsky
*Attorney, Agent, or Firm*—Keil & Weinkauf

[57] ABSTRACT

Graft copolymers (P1) contain, in any desired sequence, at least (P1.1) a hard segment having a glass transition temperature of at least 11° C., which contains at least one vinylaromatic monomer as the monomer or as one of two or more monomers copolymerizable with one another and a crosslinker component comprising at least dihydrodicyclopentadienyl acrylate as a crosslinking agent having two or more functional groups of different reactivity and at least one crosslinking agent having two or more functional groups of the same reactivity, and (P1.2) a soft segment having a glass transition temperature of not more than 10° C., which contains at least one acrylate as the monomer or as one of two or more monomers copolymerizable with one another, and blends and thermoplastic materials contain said graft copolymers.

40 Claims, No Drawings

POLYMER COMPOSITIONS FOR GRAFT COPOLYMER AS WELL AS MIXTURES THEREOF AND THERMOPLASTIC COMPOUNDS CONTAINING THEM

The present invention relates to a graft copolymer (P1) containing, in any desired sequence, P1.1) a hard segment having a glass transition temperature of at least 11° C., which contains a vinylaromatic monomer as the monomer or as one of two or more monomers copolymerizable with one another and a crosslinker component comprising at least dihydrodicyclopentadienyl acrylate as a crosslinking agent having two or more functional groups of different reactivity and at least one crosslinking agent having two or more functional groups of the same reactivity and P1.2) a soft segment having a glass transition temperature of not more than 10° C., which contains at least one acrylate as the monomer or as one of two or more monomers copolymerizable with one another.

The present invention furthermore relates to a process for the preparation of these segments and to the use thereof for the preparation of graft copolymers, processes for the preparation of these graft copolymers, the use thereof in blends, blends containing graft copolymers, processes for the preparation of these blends and the use of these graft copolymers and blends for the preparation of thermoplastic materials and these thermoplastic materials. Preferred embodiments are described in both the subclaims and the description. The present invention furthermore relates to moldings, films, fibers and coatings which contain or use the novel graft copolymers, blends and materials.

Graft copolymers, which are frequently also referred to as core-shell particles, are known, for example, as impact modifiers for plastics, such as styrene/acrylonitrile copolymers, polyvinyl chloride (PVC), polymethyl methacrylate or polycarbonate. They may be composed of two or more stages. The grafting base, the core, may consist of an elastomeric soft segment, ie. one having a glass transition temperature of less than about 24° C., for example less than 0° C., or a nonelastomeric, hard segment, ie. one having a glass transition temperature of more than about 25° C., for example more than 50° C. The graft layer, shell, can accordingly be hard or soft, respectively, or, in the case of multistage graft copolymers, alternately hard or soft and soft or hard, respectively.

The glass transition temperature of the individual stages can be influenced in each case by the choice of the monomers and also by the addition of one or more crosslinking agents. For example, monomers which have two or more functional groups which are capable of reacting with the monomers forming the grafting base or graft layer have crosslinking activity. If all functional groups of the polyfunctional monomer react at the same rate, these monomers have only a crosslinking effect. If, however, the crosslinking agents contain functional groups of different reactivity, the functional groups which have not reacted may serve as grafting points, for example for binding a graft layer to the grafting base. Such crosslinking agents therefore have not only crosslinking activity but also graft-linking activity.

The purposes for which graft copolymers may be used, for example the manner in which they influence optical quality, colorability, stability to weathering or cracking under impact and stress crack corrosion in molding materials, depend on their composition as well as on their size and morphology.

It has not been possible to date to prepare graft copolymers (for example those composed of a polystyrene core, a first shell of polybutyl acrylate and a second shell of styrene/acrylonitrile copolymers) of large particle size having a true core-shell morphology if core and shell materials were incompatible with one another (cf. for example H. Okubo, Makromol. Chem., Macromol. Symp. 35/36 (1990), 307–325). Above certain particle diameters of the grafting base (above about 100 to 150 nm and total particle sizes above about 200 nm), it is in fact found that grafting base and graft layer do not have any defined core-shell morphology in such graft copolymers. The core is not completely and essentially concentrically surrounded by the graft layer. The grafting base and graft layer are partially mixed while the core material partially forms the outer phase boundary of the core-shell particle. This gives rise to a raspberry-like morphology.

It is for this reason that the graft copolymers known to date which have a defined core-shell morphology and whose core and shell materials are incompatible with one another have only a small core diameter, or a core diameter which is only small in relation to the total size of the graft copolymers, or contain a grafting base comprising material which is compatible with that of the graft layer.

The compatibility of two polymer components is understood as meaning in general the miscibility of the components or the tendency of one polymer to dissolve in the other polymer component (cf. B. Vollmert, Grundriβ der makromolekularen Chemie, Volume IV, page 222 et seq., E. Vollmert-Verlag 1979).

Two polymers are all the better compatible the smaller the difference between their solubility parameters. Such parameters and the enthalpy of mixing cannot be determined in a standard manner for all polymers, so that the solubility can be determined only indirectly, for example by torsional vibration measurements or differential thermal analysis (DTA) measurements.

A system comprising two or more polymers may be assumed to be miscible, ie. compatible, at least when it fulfills at least one of the criteria:

Optical transparency

A film of polymers compatible with one another appears optically transparent; however, if they are incompatible, the film appears optically opaque. In case of doubt, the degree of separation can be determined by investigation under the electron microscope.

Glass transition temperature:

Polymers which are miscible with one another, ie. compatible, exhibit under thermal loads (DTA or differential scanning calorimetry (DSC) measurements), only one glass transition temperature which is between the glass transition temperatures of the starting polymers. In the case of partially compatible polymers, two different glass transition temperatures may be detected.

Nuclear magnetic resonance (NMR) relaxation:

A very sensitive method is the determination of the polymer miscibility by NMR relaxation time measurements. In the case of immiscible polymers, the spin-spin or spin-lattice relaxation times of the pure polymers are measured; in the case of miscible polymers, other relaxation times occur.

Other methods:

Other applicable methods which may be used for determining the miscibility of polymers are turbidity measurements, scattering methods (light scattering), IR spectroscopy and fluorescence techniques (L. A. Utracki, Polymer Alloys and Blends, pages 34–42, New York 1989).

Examples of polymers which are miscible with one another are documented in detail in various monographs (eg.

J. Brandrup and E. H. Immergut: Polymer Handbook, 3rd Edition, 1989).

For example, U.S. Pat. No. 4,108,946 described a grafting base having a particle size of up to 240 nm and comprising crosslinked monomer mixtures of styrene/acrylonitrile or styrene/acrylonitrile/methyl methacrylate, which grafting base is provided with a graft layer comprising acrylates. Pure polystyrene as grafting base is designated as undesirable.

DE-A-33 40 526 disclosed graft copolymers which are each composed of a nonresilient core having diameters of up to 500 nm, preferably up to 200 nm, and a crosslinked acrylate shell. Preferably, methyl methacrylate is predominantly used for the monomer material of the core.

Likewise, U.S. Pat. No. 3,793,402 disclosed graft copolymers whose grafting bases are crosslinked. Polyvinylbenzenes, such as divinyl- or trivinylbenzene, are described as crosslinking agents for grafting bases which preferably consist of styrene or substituted styrenes, but the novel, advantageous combinations of crosslinking agents are not used.

Furthermore, DE-A-22 44 519 described graft copolymers which each contain a grafting base based on vinylaromatic compounds and up to 10% by weight of crosslinking monomers. Moreover, DE-A-41 32 497 disclosed graft copolymers whose grafting bases are predominantly composed of vinylaromatic monomers and which may contain crosslinking agents as well as graft-linking agents. Either graft copolymers which contain small cores (up to about 150 nm) or those which have no defined core-shell morphology can be obtained by the process described there.

In order to obtain thermoplastic materials having good impact strength, graft rubbers are added to the matrix-forming polymers which are brittle at room temperature. The preparation of such impact modifiers has long been known and is described, for example, in DE-A-12 60 135, DE-A-23 11 129 and DE-A-28 26 925. If the matrix consists of polystyrene or styrene copolymers, it is found that the efficiency of the graft copolymers with respect to their toughening activity increases with increasing size of the graft copolymers. When small-particled graft rubbers are used, there is simultaneously the problem that the toughness of the toughening materials depends to a great extent on the processing temperature.

Materials having improved impact strength with constant good colorability can be obtained by mixing a large-particled rubber component with a small-particled one (bimodal rubber particles), as described in DE-A-28 26 925. Often, the resulting impact strength, in particular the low temperature impact strength, of the materials is insufficient for high stress. Moreover, the impact strength cannot be increased by adding any desired amount of the large-particled rubber, since otherwise the colorability is substantially impaired.

It is an object of the present invention to provide plastics, in particular thermoplastic materials, which have better impact strength and stress crack corrosion and in particular better multiaxial impact strengths, especially at low temperatures, for example below 0° C., preferably independently of the processing temperature, and can be more readily colored and have more resistant surfaces, and whose surface characteristics, in particular gloss and dullness, can be readily established.

In this context, it is a further object of the invention to provide graft copolymers in which the particle size and a defined phase transition can be established, the establishment of small particles (<200 nm) and large particles (≧200 nm) with defined phase transitions being particularly important.

It is a further object of the present invention to provide blends of graft copolymers which contain the abovementioned graft copolymers, and blends preferably comprising small-particled and large-particled graft copolymers are preferably to be provided.

It is a further object of the present invention to provide products which are resistant to weathering and are based on acrylonitrile/styrene/acrylate (ASA) polymers, in particular those having a polystyrene-co-acrylonitrile matrix, which, in addition to the advantageous properties of the known materials, such as resistance to weathering and to aging, have very good toughness in combination with good colorability and independence of the toughness of the processing temperatures.

We have found, surprisingly, that these objects are achieved by the graft copolymers defined at the outset and the graft copolymer blends containing them and by thermoplastic materials containing the graft copolymers and/or blends.

The graft copolymers are denoted by P. The number following P numbers the graft copolymers serially. The number following this denotes the segments which the graft copolymer contains. In the case of preferred novel graft copolymers in which the order of the successive segments is not free but fixed, the number 1 denotes the grafting base and the numbers 2, 3, etc. denote the graft layers following the grafting base, in their sequence. The third number following P denotes the monomers, crosslinking agents or crosslinker components contained by the segment.

The novel blends are denoted by M. The number following M numbers the blends serially. The Roman numeral following M in second place and appearing in upper case letters denotes the graft copolymers which the blend contains. T denotes the novel thermoplastic materials. The number following T numbers the thermoplastic materials serially. The Roman numerals written in lower case letters denote the components contained by the materials.

Novel graft copolymers P1, preferably having a core-shell morphology, preferably contain, as the grafting base, a hard segment P1.1 having a glass transition temperature of at least 1° C., which contains at least one vinylaromatic monomer as the monomer or as one of two or more monomers copolymerizable with one another and a crosslinker component comprising at least dihydrodicyclopentadienyl acrylate as a crosslinking agent having two or more functional groups of different reactivity and at least one crosslinking agent having two or more functional groups of the same reactivity, and, as the graft layer, a soft segment P1.2 having a glass transition temperature of not more than 10° C., which contains at least one alkyl acrylate as the monomer or as one of two or more monomers copolymerizable with one another, the phase transition between the segments preferably being defined, ie. either sharp or diffuse.

The novel hard segments P1.1 preferably have a glass transition temperature of at least 11° C., preferably at least 25° C., particularly preferably at least 50° C., it being particularly preferred according to the invention if the hard segments have a glass transition temperature of from 80 to 130° C.

In a preferred embodiment in which the hard segment P1.1 is used as the core-like grafting base, said segment has an average particle size ($d_{50}$) of 200–2000 nm, in particular 250–1000 nm, particularly preferably 350–800 nm.

In another embodiment according to the invention, the hard segment P1.1, if used as the core-like grafting base, has an average particle size ($d_{50}$) of 40–200 nm, in particular 50–150 nm, particularly preferably 60–120 nm.

In all cases, the stated average particle size is the weight average particle size as determined by means of an analytical ultracentrifuge according to the method of E. Scholtan and H. Lange, Kolloid-Z. und Z.-Polymere 250 (1972), 782–796. The ultracentrifuge measurements give the integral mass distribution of the particle diameter of a sample. From this it is possible to calculate the percentage by weight of the particles which have a diameter equal to or smaller than a certain size. The average particle diameter, which is also referred to as the $d_{50}$ value of the integral mass distribution, is defined as the particle diameter at which 50% by weight of the particles have a smaller diameter than the diameter which corresponds to the $d_{50}$ value. Furthermore, 50% by weight of the particles have a larger diameter than the $d_{50}$ value.

Some of the preferred novel embodiments of the hard segments P1.1 preferably contain at least one vinylaromatic monomer as the monomer or as one of two or more monomers copolymerizable with one another and a crosslinker component which contains at least dihydrodicyclopentadienyl acrylate as a crosslinking agent having two or more functional groups of different reactivity and at least divinylbenzene as the crosslinking agent having two or more functional groups of the same reactivity.

Further preferred embodiments of the novel hard segments P1.1 preferably contain at least one vinylaromatic monomer as the monomer or as one of a plurality of monomers copolymerizable with one another and a crosslinker component which contains at least dihydrodicyclopentadienyl acrylate as a crosslinking agent having two or more functional groups of different reactivity and at least butanediol diacrylate as the crosslinking agent having two or more functional groups of the same reactivity.

Particularly preferred embodiments of the novel hard segments P1.1 preferably contain at least one vinylaromatic monomer as the monomer or as one of two or more monomers copolymerizable with one another and a crosslinker component which contains dihydrodicyclopentadienyl acrylate and divinylbenzene and/or butanediol diacrylate.

Hard segments P1.1 are preferably composed of from 50 to 99.8, especially from 60 to 99, particularly preferably from 60 to 98, % by weight, based on the components P1.1.1 to P1.1.4, of at least one vinylaromatic monomer P1.1.1.

Novel vinylaromatic monomers preferably of not more than 20 carbon atoms are, for example, styrene, α-methylstyrene or styrenes alkylated on the nucleus, such as p-methylstyrene or p-tert-butylstyrene, styrene, α-methylstyrene or p-methylstyrene or mixtures thereof being preferably used and styrene being particularly preferably used.

The novel hard segments P1.1 may have, for example, in addition to the monomer P1.1.1, also monomers P1.1.2 copolymerizable therewith, preferably non-vinylaromatic ones.

Monomers P1.1.2 preferably of not more than 20 carbon atoms are, for example, n-butyl acrylate, acrylonitrile, methacrylonitrile, acrylic acid, methacrylic acid, methyl methacrylate, glycidyl methacrylate, maleic anhydride, tert-butyl acrylate or vinyl methyl ether and mixtures thereof. Monomers P1.1.2 preferred according to the invention are acrylonitrile and methyl methacrylate. The amount of the monomers P1.1.2 is from 0 to 49.8, preferably from 0 to 39, particularly preferably from 0 to 38, % by weight, based on the components P1.1.1 to P1.1.4.

Furthermore, the hard segments P1.1 preferably contain a crosslinker component P1.1.3 in an amount of from 0.1 to 25, preferably from 0.5 to 10, particularly preferably from 1 to 5, % by weight, based on the components P1.1.1 to P1.1.4.

The crosslinker component may contain dihydrodicyclopentadienyl acrylate (α) of the formulae Ia and Ib

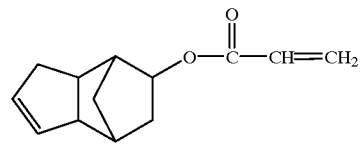

(I)

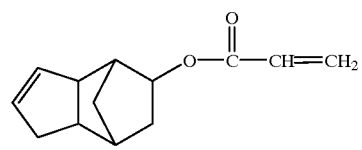

(Ib)

alone or in combination with at least one other crosslinking agent having functional groups of different reactivity (β).

According to the invention, the crosslinker component preferably comprises from 0.1 to 100, especially from 25 to 100, particularly preferably from 50 to 100, % by weight, based on α, and β of α and from 0 to 99.9, preferably from 0 to 75, particularly preferably from 0 to 50, % by weight, based on α and β, of β.

Examples of suitable crosslinking agents β are ethylenically unsaturated monomers which carry epoxy, hydroxyl, carboxyl, amino or acid anhydride groups. These include hydroxyalkyl acrylates and hydroxyalkyl methacrylates, such as hydroxy-$C_1$–$C_{10}$-alkyl acrylates or hydroxy-$C_1$–$C_{10}$-alkyl methacrylates, in particular hydroxyethyl acrylate or hydroxy-n-propyl acrylate. Allyl methacrylate, methallyl methacrylate, acryloylalkoxysilanes or methacryloylalkoxysilanes of the formula II

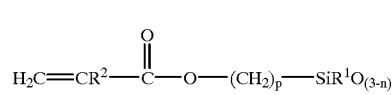

(II)

where $R^1$ is $C_1$–$C_3$-alkyl or phenyl, preferably methyl, $R^2$ is hydrogen or methyl, n is an integer from 0 to 2 and p is an integer from 1 to 6, preferably from 1 to 4, are preferred. Preferred examples are:
β-Methacryloyloxyethyldimethoxymethylsilane,
γ-methacryloyloxy-n-propylmethoxydimethylsilane,
γ-methacryloyloxy-n-propylmethoxymethylsilane,
γ-methacryloyloxy-n-propyltrimethoxysilane,
γ-methacryloyloxy-n-propyldimethoxymethylsilane,
γ-methacryloyloxy-n-propyldiethoxymethylsilane and
δ-methacryloyloxy-n-butyldiethoxymethylsilane.

The preferred mixtures of crosslinking agents α and β include dihydrodicyclopentadienyl acrylate and hydroxyethyl acrylate; dihydrodicyclopentadienyl acrylate and allyl methacrylate; dihydrodicyclopentadienyl acrylate, hydroxyethyl acrylate and allyl methacrylate; dihydrodicyclopentadienyl acrylate, allyl methacrylate and β-methacryloyloxyethyldimethoxymethylsilane; dihydrodicyclopentadienyl acrylate and β-methacryloyloxyethyldimethoxymethylsilane.

A novel hard segment P1.1 preferably has, as P1.1.4, from 0.1 to 25, preferably from 0.5 to 10, particularly preferably from 1 to 7, % by weight, based on the components P1.1.1 to P1.1.4, of at least divinylbenzene as the crosslinking agent having two or more functional groups of the same reactivity.

A further novel hard segment P1.1 has from 0.1 to 25, preferably from 0.5 to 10, particularly preferably from 1 to 7, % by weight, based on the components P1.1.1 to P1.1.4, of at least butanediol diacrylate as the crosslinking agent having two or more functional groups of the same reactivity.

Suitable crosslinking agents P1.1.4 which may be used in addition to divinylbenzene and/or butanediol diacrylate but also by themselves are, for example, mono-, di-, tri- and tetraalkylene glycol diacrylates, preferably $C_1$–$C_4$-monoalkylene glycol diacrylates, such as ethylene glycol diacrylate, n-propylene glycol diacrylate, n-butylene glycol 1,3-diacrylate or n-butylene glycol 1,4-diacrylate. Mono-, di-, tri- and tetraalkylene glycol dimethacrylates are also suitable, preferably $C_1$–$C_4$-monoalkylene glycol dimethacrylates, such as ethylene glycol dimethacrylate, n-propylene glycol dimethacrylate, n-butylene glycol 1,3-dimethacrylate or n-butylene glycol 1,4-dimethacrylate. Acrylates or methacrylates of glycerol, trimethylolpropane, pentaerythritol, inositol or similar sugar alcohols are also suitable crosslinking agents P1.1.4. Examples of further suitable crosslinking agents P1.1.4 are acrylamides or methacrylamides of ethylenediamine or other aliphatic di- or polyamines. Diallyl maleate, diallyl fumarate or diallyl phthalate, triacrylamides or trimethacrylamides, triallyl cyanurate or triallyl isocyanurate and trivinylbenzene may also be used as crosslinking agent P1.1.4.

Preferably, the hard segments P1.1 have from 50 to 99.8% by weight of at least one vinylaromatic monomer (P1.1.1), from 0 to 49.8% by weight of at least one monomer (P1.1.2) copolymerizable with the monomers P1.1.1 and from 0.1 to 25% by weight of a crosslinker component comprising from 0.1 to 100% by weight of at least one crosslinking agent having two or more functional groups of different reactivity (P1.1.3) and from 0.1 to 25% by weight of divinylbenzene and/or butanediol diacrylate (P1.1.4).

In addition, a preferred novel hard segment P1.1 comprises from 0.1 to 25, preferably from 0.5 to 10, particularly preferably from 1 to 7, % by weight, based on the components P1.1.1 to P1.1.4, of divinylbenzene and/or butanediol diacrylate.

An additional novel hard segment P1.1 preferably differs from the abovementioned in that the component P1.1.3 has at least ($\alpha$) from 0.1 to 100% by weight of dihydrodicyclopentadienyl acrylate and ($\beta$) from 0 to 99.9% by weight of at least one further crosslinking agent having two or more functional groups of different reactivity.

In a further novel hard segment P1.1, preferably from 0.1 to 100, especially from 25 to 75, particularly preferably from 50 to 70% by weight of dihydrodicyclopentadienyl acrylate are used as component P1.1.3 and from 0.1 to 25, preferably from 0.5 to 10, particularly preferably from 1 to 5, % by weight of divinylbenzene and/or butanediol diacrylate as component P1.1.4.

The sums of the percentages by weight of $\alpha$ and $\beta$ and the sums of the percentages by weight of P1.1.1 to P1.1.4 should in each case be 100.

The choice of the crosslinking agents depends on the intended form of the network of the hard segment. A compact network results, for example, if the above crosslinking agent $\alpha$ is used with divinylbenzene, whereas a relatively loose network is obtained if, for example, crosslinking agent $\alpha$ is used together with tetraethylene glycol diacrylate or dimethacrylate.

The particularly preferred crosslinker mixtures include dihydrodicyclopentadienyl acrylate and butanediol diacrylate; dihydrodicyclopentadienyl acrylate and divinylbenzene; dihydrodicyclopentadienyl acrylate and ethylene glycol diacrylate; and dihydrodicyclopentadienyl acrylate and tetraethylene glycol dimethacrylate. Further preferred crosslinker mixtures are dihydrodicyclopentadienyl acrylate, butanediol diacrylate and allyl methacrylate; dihydrodicyclopentadienyl acrylate, butanediol diacrylate and hydroxyethyl acrylate; dihydrodicyclopentadienyl acrylate, butanediol diacrylate and divinylbenzene; dihydrodicyclopentadienyl acrylate, hydroxyethyl acrylate and divinylbenzene or diethylene glycol diacrylate or tetraethylene glycol dimethacrylate; dihydrodicyclopentadienyl acrylate, hydroxyethyl acrylate, allyl methacrylate and divinylbenzene or diethylene glycol diacrylate or tetraethylene glycol dimethacrylate; dihydrodicyclopentadienyl acrylate, allyl methacrylate, $\beta$-methacryloyloxyethyldimethoxymethylsilane and divinylbenzene or diethylene glycol diacrylate or tetraethylene glycol dimethacrylate; dihydrodicyclopentadienyl acrylate, $\beta$-methacryloyloxyethyldimethoxymethylsilane and divinylbenzene or diethylene glycol diacrylate or tetraethylene glycol dimethacrylate.

Other novel hard segments P1.1 preferably contain P1.1.4 in amounts of from 0.5 to 5% by weight, based on the components P1.1.1 to P1.1.4. In principle, the components P1.1.3 and P1.1.4 may be present in any ratio to one another. However, preferred hard segments P1.1 contain the components P1.1.3 and P1.1.4 in a ratio of from 1:0.5 to 1:3. However, the proportion of P1.1.4 may also be lower and may be, for example, 1:0.3 Higher proportions of P1.1.4 are also suitable, for example a ratio of P1.1.3 to P1.1.4 of up to 1:10, the ratios of P1.1.3 to P1.1.4 preferably being from 1:0.5 to 1:3 or from 1:1 to 1:3, in particular from 1:0.5 to 1:2, particularly preferably from 1:0.75 to 1:1.

The novel hard segments P1.1 are preferably prepared by a process wherein at least one vinylaromatic monomer, as the monomer or as one of two or more monomers copolymerizable with one another, and a crosslinker component which comprises at least one crosslinking agent having two or more functional groups of different reactivity, preferably at least dihydrodicyclopentadienyl acrylate, are polymerized in a first step and the product is polymerized in a second step with at least one vinylaromatic monomer, as the monomer or as one of two or more monomers copolymerizable with one another and a crosslinker component which comprises at least one crosslinking agent having two or more functional groups of different reactivity, preferably at least dihydrodicyclopentadienyl acrylate, and at least one crosslinking agent having two or more functional groups of the same reactivity, preferably at least divinylbenzene or butanediol diacrylate. The process described in this section is preferably used if the hard segments are used as the grafting base.

The two steps for the preparation of the novel hard segments P1.1 are preferably carried out as an emulsion polymerization, preferably in an aqueous phase, in the presence of one or more emulsifiers and initiators, which may be identical or different for each of the steps, at temperatures which are identical or different for each step and are from 30 to 90° C., preferably from 50 to 80° C., particularly preferably from 55 to 75° C.

For the preparation of the hard segments P1.1, a crosslinked seed latex of a monomer P1.1.1, preferably styrene, and a crosslinking agent $\alpha$ and/or $\beta$, preferably dihydrodicyclopentadienyl acrylate, is preferably first produced in a first step. In general, the novel seed latex preferably has an average particle size ($d_{50}$) of from 20 to 150 nm, especially from 50 to 100 nm. The seed latex is then reacted in a second step with further monomers P1.1.1, preferably styrene, and crosslinking agents, preferably crosslinking agents having two or more functional groups of different reactivity and/or of the same reactivity, emulsifiers, polymerization assistants and initiators to give the novel hard segments P1.1.

It is also possible to prepare the hard segment P1.1 in a one-stage process. In such a process, at least one vinylaromatic monomer, as the monomer or as one of two or more monomers copolymerizable with one another, and a crosslinker component which comprises at least one crosslinking agent having two or more functional groups of different reactivity, preferably at least dihydrodicyclopentadienyl acrylate, and a crosslinking agent having two or more functional groups of the same reactivity, preferably at least divinylbenzene and/or butanediol diacrylate, are polymerized. Furthermore, suitable emulsifiers, initiators and polymerization assistants, such as surfactants, may be present.

The step 2 described above may furthermore be effected before step 1. In this case, first at least one vinylaromatic monomer, as the monomer or as one of two or more monomers copolymerizable with one another, and a crosslinker component which comprises at least one crosslinking agent and two or more functional groups of different reactivity, preferably at least dihydrodicyclopentadienyl acrylate, and at least one crosslinking agent having two or more functional groups of the same reactivity, preferably at least divinylbenzene and/or butanediol diacrylate, are polymerized and, in a subsequent step, at least one vinylaromatic monomer, as the monomer or as one of two or more monomers copolymerizable with one another, and a crosslinker component which comprises at least one crosslinking agent having two or more functional groups of different reactivity, preferably at least dihydrodicyclopentadienyl acrylate, are polymerized.

Furthermore, the novel hard segments P1.1 may also be prepared by processes comprising more than two steps, for example three, four, five, six and seven steps. In these multistep preparation processes, the step sequences may be combined in any desired manner.

The morphology of the hard segment P1.1 depends on the method of preparation. Thus, the process which was carried out in one step gives uniform morphology. The hard segments P1.1 which were prepared in two-step or multistep processes have different regions of different morphology, depending on the number of steps.

In a novel embodiment, the hard segment used as the grafting base in a graft copolymer is preferably prepared in two or more steps. Particularly preferred here are a first preparation step in which at least one crosslinking agent having two or more functional groups of different reactivity is used and a second step in which a crosslinker component comprising at least one crosslinking agent having two or more functional groups of different reactivity and at least one crosslinking agent having two or more functional groups of the same reactivity is used, the first step preferably forming a seed latex.

In another novel embodiment, one grafting base in a hard segment P1.1 forming a graft copolymer is preferably prepared in one step, preferably a crosslinker component comprising at least one crosslinking agent having two or more functional groups of different reactivity and at least one crosslinking agent having two or more functional groups of the same reactivity being used.

If the novel hard segment P1.1 is used as the graft layer, the process is preferably carried out in one step.

The hard segments P1.1 preferably have gel contents of at least 90%, especially at least 95%, the gel content being defined as the ratio of solvent (toluene) and soluble matter to the total material. The swelling index is defined as the ratio of matter swollen in the solvent (toluene) to unswollen matter and is in general from 7 to 15 for the hard segments P1.1.

The novel hard segments P1.1 can preferably be used for graft copolymers, in particular for their preparation, the use as grafting base and as graft layer being particularly preferred.

The grafting bases consisting of hard segment P1.1 preferably have an average particle size ($d_{50}$) of up to 120 nm, in particular from 40 to 110 nm, particularly preferably from 50 to 100 nm.

However, the hard segments P1.1 may also form grafting bases having an average particle size ($d_{50}$) of from 100 to 2000 nm, preferably from 350 to 1000 nm, particularly preferably from 400 to 550 nm.

The novel soft segments P1.2 preferably have a glass transition temperature of not more than 0° C., especially not more than −20° C., particularly preferably from −100 to −30° C. The average particle size ($d_{50}$) of the soft segments P1.2 is up to 120 nm, in particular from 40 to 110 nm, particularly preferably from 50 to 100 nm, if these are used as grafting bases in a graft copolymer.

The average particle size ($d_{50}$) of the soft segments P1.2 can also be from 100 to 2000 nm, preferably from 350 to 1000 nm, particularly preferably from 400 to 550 nm, if these are used as grafting bases in a graft copolymer.

The novel soft segments P1.2 are preferably composed of from 50 to 99.9, especially from 75 to 99.9, particularly preferably from 90 to 99.9, % by weight of an acrylate (P1.2.1), from 0 to 50, preferably from 0 to 25, particularly preferably from 0 to 10, % by weight of a monomer (P1.2.2) copolymerizable with the monomer P1.2.1 and from 0.1 to 20, preferably from 0.1 to 5, particu-larly preferably from 0.1 to 3, % by weight of at least one crosslinking agent (P1.2.3).

Further novel soft segments P1.2 preferably contain at least one alkyl acrylate P1.2.1 and, if desired, at least one monomer P1.2.2 copolymerizable with the monomers P1.2.1 and at least one crosslinking agent α or β or a mixture thereof (P1.2.3). According to the invention, the amount of alkyl acrylates P1.2.1 is preferably from 30 to 99.9% by weight, that of the monomers P1.2.2 from 0.1 to 50% by weight and that of the crosslinking agents P1.2.3 from 0 to 20% by weight. Preferably, the soft segments P1.2 contain from 60 to 99.9, in particular from 65 to 99, % by weight of P1.2.1, from 0 to 39.9, preferably from 0 to 30, % by weight of P1.2.2 and from 0.1 to 10, preferably from 1 to 5, % by weight of P1.2.3. The stated weights are based in each case on the sum of the components P1.2.1 to P1.2.3.

Suitable monomers P1.2.1, preferably acrylates, particularly preferably alkyl acrylates of not more than 20 carbon atoms, are alkyl acrylates, phenylalkyl acrylates or phenoxyalkyl acrylates where the alkyl radical is of up to 18, in particular 2 to 8, carbon atoms, alone or as a mixture. n-Butyl acrylate and ethylhexyl acrylate, eg. ethyl-n-hexyl acrylate, are particularly suitable. Furthermore, all other known monomers forming rubber elastomers, such as dienes, for example 1,3-butadiene, and organosiloxanes, such as dimethylsiloxanes, may be used.

Examples of the monomers P1.2.2, preferably of not more than 20 carbon atoms, are acrylic acid or methacrylic acid derivatives differing from P1.2.1, including preferably the esters or amides thereof. Styrene, styrene substituted on the nucleus, α-methylstyrene, acrylonitrile, dienes, such as butadiene or isoprene, are also preferred as copolymerizable monomers P1.2.2. It is of course also possible to use mixtures of different monomers P1.2.2. The monomers P1.2.2 should be copolymerizable with the monomers P1.2.1.

Preferred crosslinking agents P1.2.3 are one or more of the crosslinking monomers usually used, which may be employed both individually and as a mixture with one another. The preferred crosslinker components may contain dihydrodicyclopentadienyl acrylate ($\alpha$) alone or in combination with at least one other crosslinking agent having two or more functional groups of different reactivity ($\beta$). According to the invention, the crosslinker components preferably consist of from 0.1 to 100, especially from 25 to 100, particularly preferably from 30 to 100, % by weight, based on $\alpha$ and $\beta$, of $\alpha$ and from 0 to 99.9, especially from 0 to 75, particularly preferably from 0 to 70, % by weight, based on $\alpha$ and $\beta$, of $\beta$. Particularly preferably, the crosslinker component contains from 50 to 100% by weight of $\alpha$ and from 0 to 50% by weight of $\beta$.

Examples of suitable crosslinking agents $\alpha$ and $\beta$ for the soft segment P1.2 correspond to those crosslinking agents $\alpha$ and $\beta$ which are mentioned for P1.1. Those mixtures of the crosslinking agents $\alpha$ and $\beta$ which are preferred in the case of P1.1 are also preferred here in the case of P1.2. The list of further suitable crosslinking agents P1.1.4 is also applicable to suitable crosslinking agents P1.2.3 having two or more functional groups of the same reactivity.

The choice of the crosslinking agent P1.2.3 depends, for example, on the network which the soft segment P1.2 is to have, either as a grafting base or as a graft layer. A compact network is obtained, for example, if crosslinking agent $\alpha$ is used together with divinylbenzene, whereas a relatively loose network is obtained if, for example, crosslinking agent $\alpha$ is employed with tetraethylene glycol diacrylate or dimethacrylate. The particularly preferred mixtures of crosslinking agents include dihydrodicyclopentadienyl acrylate and butanediol diacrylate; dihydrodicyclopentadienyl acrylate and divinylbenzene; dihydrodicyclopentadienyl acrylate and diethylene glycol diacrylate; and dihydrodicyclopentadienyl acrylate and tetraethylene glycol dimethacrylate. Further mixtures of crosslinking agents for the soft segments P1.2 correspond to the lists for mixtures of crosslinking agents of the hard segment P1.1.

Crosslinking agents having two or more functional groups of the same reactivity and crosslinking agents having two or more functional groups of different reactivity may thus be present, in each case by themselves or in combination, in the soft segments P1.2.

The soft segments P1.2 can be prepared both in one step and in a plurality of steps, for example two, three, four, five or six, preferably two or three, particularly preferably two, steps. In one embodiment of the one-step synthesis of the soft segment P1.2, either a crosslinking agent having two or more functional groups of the same reactivity or a crosslinking agent having two or more functional groups of different reactivity is used. In another embodiment, one or more crosslinking agents of both generic types may be used in the one-step synthesis. The one-step synthesis can be used for the preparation of both grafting bases and graft layers from the soft segment P1.2. Furthermore, grafting bases and graft layers can be prepared from the soft segment P1.2 by a multistep synthesis. The one-step or multistep synthesis is carried out similarly to the corresponding syntheses of P1.1 using the monomers and crosslinking agents described above for P1.2. If the synthesis is carried out in one step, the soft segment has, as a rule, uniform morphology. If the synthesis is carried out in a plurality of steps, the soft segment may have a morphology comprising different phases.

In the one-step synthesis, at least one alkyl acrylate is reacted with one or more crosslinking agents.

In the preparation of soft segments P1.2 in a plurality of steps, at least one alkyl acrylate is prepolymerized with a crosslinking agent and the prepolymer is reacted in a further step with at least one further monomer.

The soft segments P1.2 have, as a rule, gel contents of at least 90%, preferably at least 95%, and swelling indices of in general from 7 to 15.

The novel segments P1.1 and P1.2 can be preferably used for graft copolymers, in particular for the preparation thereof, the use as a grafting base and as a graft layer being particularly preferred.

Furthermore, the novel graft copolymers P1 may preferably contain at least one, preferably from 1 to 7, particularly preferably from 1 to 3, additional segments (P2.3). The segment P2.3 preferably contains at least one vinylaromatic monomer, as mentioned, for example, under P1.1.1. In addition, P2.3 may contain one or more further monomers, monomers which are copolymerizable with the vinylaromatic monomer being preferred. If required, the segment P2.3 may contain one or more crosslinking agents; for example, the crosslinking agents and mixtures of crosslinking agents which are used for the hard segments P1.1 may be employed. P2.3 preferably consists of one or more polymer compositions P2.3.1 and P2.3.2 in any desired sequence. According to the invention, it is particularly preferred if the polymer compositions P2.3.1 and P2.3.2 alternate with one another, beginning with P2.3.1. The number of successive and preferably alternating polymer compositions P2.3.1 and P2.3.2 is from 2 to 10, preferably from 2 to 7, particularly preferably from 2 to 5.

A particularly preferred segment P2.3 contains, in any desired sequence, preferably in this sequence, a polymer composition P2.3.1 containing P2.3.1.1) from 30 to 99% by weight of at least one vinylaromatic monomer, P2.3.1.2) from 0 to 50% by weight of at least one monomer copolymerizable with P2.3.1 and P2.3.1.3) from 0.1 to 20% by weight of a crosslinking agent ($\alpha$ or $\beta$ or of a mixture thereof and/or, preferably, a second polymer composition P2.3.2 containing P2.3.2.1) from 50 to 100% by weight of at least one vinylaromatic monomer and P2.3.2.2) from 0 to 50% by weight of at least one monomer copolymerizable with P2.3.2.1, the sum of the percentages by weight of P2.3.1.1 to P2.3.1.3 and of P2.3.2.1 to P2.3.2.2 being 100 in each case.

Where a plurality of polymer compositions P2.3.1 and/or P2.3.2 follow one another in succession, it is preferable, according to the invention, if the compositions of the individual components of the successive polymer compositions can vary within the abovementioned limits.

The preparation of the segment P2.3 can be carried out in one step or in a plurality of steps. The synthesis in one step is preferred when no crosslinking agent or only one crosslinking agent is used. A preparation effected in a plurality of steps is advantageous when two or more crosslinking agents are used. The preparation process effected in a plurality of steps is particularly preferred for polymer compositions of the type P2.3.1. Statements made in connection with the preparation of the hard segment P1.1 are also applicable to the preparation effected in a plurality of steps.

A novel graft copolymer P3 is preferably composed of at least

P3.1) a soft segment having a glass transition temperature of not more than 0° C. and comprising at least one alkyl acrylate and at least one crosslinking agent as the grafting base and as the graft layers comprising the segment sequences of the graft copolymers P1 and P2 described above.

Graft copolymers P3 particularly preferably consist of the soft segment P3.1 described above, at least one hard segment P3.2, the composition of which corresponds to that of the hard segment P1.1 or P2.1, and at least one soft segment P3.3, the composition of which corresponds to that of the soft segment P1.2 or P2.2.

If required, additional graft layers P3.4 which correspond to the graft layers P2.3 may be present.

A further novel soft segment P3.1 preferably has a glass transition temperature of not more than 0° C. and contains at least one alkyl acrylate and at least one crosslinking agent.

Preferably, the soft segment P3.1 contains

P3.1.1) from 30 to 99.9% by weight of at least one alkyl acrylate,

P3.1.2) from 0 to 50% by weight of at least one monomer copolymerizable with the monomers P3.1.1 and P3.1.3) from 0.1 to 20% by weight of at least one crosslinking agent, the sum of the percentages by weight of P3.1.1 to P3.1.3 being 100.

Statements made in connection with soft segment P1.2 are applicable to the selection of monomers and crosslinking agents, particle size and the preparation process.

The soft segments P3.1 have, as a rule, gel contents of at least 90%, preferably at least 95%, and swelling indices of in general from 7 to 15.

The soft segment P3.1 may be used as a grafting base or as a graft layer. Graft copolymers contain soft segments, preferably soft segments P3.1, as a grafting base in amounts of from 0.01 to 99, preferably from 0.1 to 50, particularly preferably from 0.1 to 20, % by weight. It has proven particularly advantageous to incorporate the soft segment, in particular P3.1, in an amount of from 0.1 to 10, preferably from 0.1 to 5, particularly preferably from 0.2 to 4, % by weight as a grafting base into a graft copolymer.

Hard and soft segments described in the above sections and the segment additionally described may be present in graft copolymers in any desired combination and in any desired frequency.

The following combinations for novel graft copolymers, with H (hard) for segment P1.1, S (soft) for segment P1.2 and S' (soft) for segment P3.1 and A for the additional segment, are preferred, the first-mentioned always denoting the grafting base and the subsequently mentioned ones denoting the graft layer or layers:

HS, HS', SH, S'H, SA, S'A, HSA, HS'A, SHA, S'HA, SHS, S'HS, SHS', S'HS', SHSA, S'HSA, SHS'A, S'HS'A, SS, S'S, SS', S'S', SSA, S'SA, SS'A, S'S'AS, S', HHS, HHS', HHSA, HHS'A, HSHS, HS'HS, HSHS', HS'HS', HSHSA, HS'HSA, HSHS'A, HS'HS'A and particularly preferably SH, S'H, SA, S'A, HSA, HS'A, SHA, S'HA, SHSA, S'HSA, SHS'A, S'HS'A, SSA, S'SA, SS'A, HHSA, HHS'A, HSHSA, HS'HSA, HSHS'A and HS'HS'A.

The novel graft copolymers are preferably composed of a grafting base and one or more graft layers and preferably have a core-shell morphology which has the phase transitions defined as being preferred. The novel defined phase transitions are understood as meaning both sharp and diffuse phase transitions. In the case of a sharp phase transition, the phases of the individual segments bound one another directly, very small amounts, if any, of the monomers of the individual phases or segments being present together. In the case of diffuse phase transitions, a region in which the monomers of one segment are present together with the monomers of the other segment lies between the individual segments.

The particles formed from the graft copolymers have an average particle size ($d_{50}$) of from 100 to 2000 nm, preferably from 350 to 1000 nm, particularly preferably from 400 to 550 nm. Further particles formed from the graft copolymers have an average particle size ($d_{50}$) of up to 180 nm, in particular from 40 to 120 nm, particularly preferably from 50 to 100 nm.

Novel graft copolymers which are composed of a hard segment and a soft segment, preferably P1.1 and P1.2, preferably contain from 0.1 to 90, especially from 5 to 55, particularly preferably from 10 to 50, % by weight of a hard segment and from 10 to 99.9, especially from 45 to 95, particularly preferably from 50 to 90, % by weight of a soft segment, the percentages in each case being based on the two segments.

Novel graft copolymers comprising a hard segment, preferably P1.1, a soft segment, preferably P1.2, and at least one additional segment P2.3 contain preferably from 0.1 to 99, especially from 4 to 60, particularly preferably from 5 to 30, % by weight of a hard segment as the grafting base, from 4.9 to 98.9, preferably from 20 to 95, particularly preferably from 30 to 70, % by weight of a soft segment and from 1 to 95, preferably from 1 to 50, particularly preferably from 25 to 40, % by weight of an additional segment, the percentages being based on the abovementioned segments.

Novel graft copolymers which are composed of a soft segment, preferably P3.1, a hard segment, preferably P1.1, and a soft segment, preferably P1.2, and at least one additional segment, preferably P2.3, contain preferably from 0.1 to 5, especially from 1 to 3, particularly preferably from 1 to 35, % by weight of a soft segment as the grafting base, from 1 to 95, preferably from 10 to 50, particularly preferably from 10 to 30, % by weight of a hard segment, from 3.8 to 98.8, preferably from 10 to 69, particularly preferably from 30 to 60, % by weight of a soft segment and from 0.1 to 90, preferably from 20 to 69, particularly preferably from 37.5 to 59, % by weight of an additional segment, the percentages being based on the abovementioned segments.

For grafting the grafting bases comprising hard segments, preferably P1.1, the components of the soft segments, preferably P1.2, are polymerized in the presence of the hard segments. It is advantageous here to carry out the graft copolymerization for the formation of the first graft layers from the soft segments once again as an emulsion polymerization, preferably in aqueous emulsion. It is particularly advantageous to effect said copolymerization in the same system as the polymerization of the grafting bases comprising the hard segments. Said system may correspond to the emulsifiers or initiators used for the preparation of the hard segments. Emulsifiers, initiators and polymerization assistants may each be initially taken alone or as a mixture, if required together with the emulsion of the grafting bases comprising the hard segments. However, they may also be added, alone or as a mixture, if required together with the monomers used for the graft layers comprising the soft segments, to the emulsion of the grafting bases. For example, initiators and, as polymerization assistants, buffer substances may be initially taken together with the emulsions of the grafting bases, and the monomers for the graft layers comprising the soft segments then added dropwise together with emulsifiers. In general, preferably if a soft segment follows a hard segment, the ratio of the feed rates (F) of the monomers and crosslinking agents forming a hard segment to the monomers and crosslinking agents forming a soft segment and the ratio of the feed rates of the emulsifiers for this hard segment to the emulsifiers for this soft segment (F1 and F2, respectively) are, independently of one another, from 0.05 to 20, preferably from 0.1 to 10, particularly preferably from 0.2 to 3, in each case.

The grafting bases comprising the hard segments and the graft layer comprising the soft segments are polymerized, preferably in succession, in a feed process. Here, the ratio of the feed rates F1 and F2 is from 0.05 to 20, preferably from 0.1 to 10, particularly preferably from 0.2 to 3, at from 20 to 80° C., the reaction temperature being preferably from 40 to 80° C., particularly preferably from 60 to 80° C.

The ratio of the feed rates is defined, for example using P1, as follows:

F1 is equal to the amount of the monomers and crosslinking agents P1.1.1 to P1.1.4 [g/h]/amount of the monomers P1.2.1 to P1.2.3 [g/h];

F2 is equal to the amount of emulsifier for P1.1 [g/h]/amount of emulsifier for P1.2 [g/h].

The graft copolymerization is controlled in general in such a way that the mass ratios of the grafting base comprising the hard segments to the graft layers comprising the soft segments are from 1:0.5 to 1:20, preferably from 1:1 to 1:10. Further preferred novel graft copolymers have a mass ratio of hard segment to soft segment of from 1:2 to 1:8.

The novel graft copolymers containing the hard segments as grafting bases and the soft segments as graft layers may contain, for example, one or more, preferably up to three, additional segments, preferably P2.3. These are present in the novel graft copolymers in amounts of from 0.1 to 90, preferably from 15 to 50, particularly preferably from 25 to 50, % by weight, based on all segments. The particularly preferred graft copolymers include those having one or two further graft layers comprising additional segments. Preferred graft copolymers are those which have from 0 to 99.9, preferably from 25 to 95, particularly preferably from 30 to 50, % by weight, based on the additional segments, of a second graft layer having a glass transition temperature of at least 25° C. (P2.3.1) and from 0.1 to 100, preferably from 25 to 95, particularly preferably from 50 to 70, % by weight, based on the graft layers comprising the additional segments, of a further graft layer having a glass transition temperature of at least 25° C. (P2.3.2), in any desired sequence.

For grafting the grafting bases comprising soft segments, preferably P3.1, with hard segments, preferably P1.1, the components of the hard segments are polymerized in the presence of the grafting base comprising the soft segments. Here, it is advantageous to carry out the graft copolymerization for the formation of the first graft layers comprising hard segments once again as an emulsion polymerization, preferably in aqueous emulsion. It is particularly advantageous to effect said emulsion polymerization in the same system as the polymerization of the grafting bases comprising the soft segments. Said system may correspond to the emulsifiers or initiators used for the preparation of the soft segments. Emulsifiers, initiators and polymerization assistants may each be initially taken alone or as a mixture, together with the emulsion of the grafting bases comprising soft segments. However, they may also be added, alone or as a mixture, if required together with the monomers used for the grafting bases comprising the hard segments, to the emulsion of the grafting bases. For example, initiators and, as polymerization assistants, buffer substances may be initially taken, if required together with the emulsions of the grafting bases, and the monomers for the graft layers comprising the hard segments may then be added dropwise together with emulsifiers. The grafting bases comprising the soft segments and the graft layers comprising the hard segments are polymerized in succession in a feed process. The ratio of the feed rates F1' and F2' is, independently of one another, preferably in each case from 0.05 to 20, especially from 0.1 to 10, particularly preferably from 0.2 to 3, F1' being equal to the amount of the monomers and crosslinking agents of the soft segment divided by the amount of the monomers of the hard segment and F2' being equal to the amount of emulsifier of the soft segment divided by the amount of emulsifier of the hard segment, in each case in g/h.

The graft copolymerization is controlled in general in such a way that the mass ratios of the grafting bases comprising the soft segments to the graft layers comprising the hard segments are from 1:1 to 1:100, preferably from 1:10 to 1:50. Further preferred novel graft copolymers have a mass ratio of soft segment to hard segment of from 1:20 to 1:40.

The novel graft copolymers containing the soft segments as grafting bases and the hard segments as graft layers may contain, for example, one or more, preferably up to three, additional segments. These are present in the novel graft copolymers in amounts of from 0.1 to 90, preferably from 15 to 50, particularly preferably from 25 to 50, % by weight, based on all segments.

The particularly preferred graft copolymers include those having one or two further graft layers comprising additional segments. Preferred graft copolymers are those which have from 0 to 99.9, preferably from 25 to 95, particularly preferably from 30 to 80, % by weight, based on the additional segments, preferably P2.3, of a second graft layer having a glass transition temperature of at least 25° C. (P2.3.1) and from 0.1 to 100, preferably from 25 to 75, particularly preferably from 20 to 70, % by weight, based on the graft layers comprising the additional segments, of a further graft layer having a glass transition temperature of at least 25° C. (P2.3.2), in any desired sequence.

The grafting of the graft layers comprising additional segments onto the novel graft copolymers can be effected by suspension, mass or solution polymerization but is preferably carried out as an emulsion polymerization. The grafting on of additional segments is preferably carried out in the same polymerization system as the previously prepared graft copolymer, further emulsifiers and initiators preferably being added.

The graft layers of the novel graft copolymers can in principle have any layer thickness; they preferably have either an average layer thickness of up to 120 nm, especially from 10 to 110 nm, particularly preferably from 20 to 100 nm, or from 120 to 2000 nm, preferably from 350 to 1000 nm, particularly preferably from 450 to 600 nm. Depending on the average particle size, the average layer thickness is determined from individual layer thicknesses.

The graft copolymers may have either a narrow or a broad particle size or layer thickness distribution. They preferably have a narrow particle size or layer thickness distribution. The particle size distribution is defined as the quotient $Q=(d_{90}-d_{10})/d_{50}$. The $d_{10}$ and $d_{90}$ values are defined similarly to the $d_{50}$ value, except that they are based on 10 and 90% by weight, respectively, of the particles. Further preferred novel graft copolymers have Q values of 0.3 or less, preferably 0.15 or less, particularly preferably from 0.15 to 0.01. The above statement also applies to the layer thickness distribution.

Even when the grafting base has large particle sizes, for example from 400 to 800 nm, or substantially more grafting base is present in relation to the graft layer following the grafting base, for example in the case of a weight ratio of grafting base to graft layer of from 1:1 to 50:1, particularly preferably from 5:1 to 20:1, the novel graft copolymers preferably have a virtually perfect core-shell morphology. The grafting base forms a core having a defined phase boundary with the graft layer. It is surrounded essentially concentrically by the graft layer. As a rule, the width of the phase boundaries of grafting base to graft layer and between the various graft layers is on average at least 50 nm, preferably at least 10 nm, particularly preferably at least 5 nm, or from 0.1 to 50 nm, preferably from 0.1 to 10 nm, particularly preferably from 0.01 to 5 nm.

The width of the phase boundary may be determined by electron microscopy. For this purpose, sections having a thickness of less than 100 nm are prepared by means of a cryo-ultramicrotome and ruthenium tetroxide is deposited on said sections by vapor deposition in the course of 20 minutes at 30° C. Only the particles cut at the equator are measured, and the mean value of the distance of the phase boundaries to be evaluated are determined for 10 particles.

In addition to the width of the phase boundary of the novel graft copolymers, it is also possible to control the type of transition at the phase boundary. A sharp transition or a diffuse transition may be present in the graft copolymers. Graft copolymers having a sharp transition preferably have a very narrow phase boundary with an abrupt transition. The width of the phase boundary in the case of sharp transitions is from 0.1 to 10 nm, preferably from 0.1 to 5 nm, particularly preferably from 0.1 to 3 nm. Preferred graft copolymers having a diffuse transition are those in which the diffuse transition is very uniform along a straight line running from the inside to the outside when viewed from the grafting base. In the case of the diffuse transitions, larger phase boundary regions are preferred, for example from 0.1 to 5 nm, preferably from 4 to 10 nm, particularly preferably from 5 to 50 nm. The width of the phase boundary and the type of transition at the phase boundary can be controlled, for example, by the feed rates F.

The novel graft copolymers can be prepared by the methods disclosed in, inter alia, DE-B-12 60 135, DE-A-23 11 129, DE-A-28 26 925, EP-A-81 761, EP-A-450 485 and U.S. Pat. No. 3,691,260.

First, the grafting base is polymerized from its components, preferably in aqueous emulsion at from 20 to 100° C., preferably from 40 to 80° C., particularly preferably from 50 to 70° C. Conventional emulsifiers, for example alkali metal salts of alkanesulfonic or alkylarylsulfonic acids, alkylsulfates, fatty alcohol sulfonates, salts of higher fatty acids of 10 to 30 carbon atoms or resin soaps, may be used. The potassium or sodium salts of alkanesulfonates or of fatty acids of 10 to 18 carbon atoms are preferably used for this purpose. It is advantageous to use the emulsifiers in an amount of from 0.1 to 5, preferably from 0.2 to 2, % by weight, based on the total weight of the monomers used for the preparation of the segments forming the grafting base.

In general, the procedure is carried out at a water/monomer ratio of from 4:1 to 0.7:1, preferably from 2:1 to 0.8:1, particularly preferably from 1.5:1 to 1:1. The polymerization initiators used are in particular conventional persulfates, for example potassium peroxodisulfate; however, redox systems are also suitable. The amount of initiators, for example from 0.1 to 2.5% by weight, based on the total weight of the monomers, depends in a known manner on the desired molecular weight. The polymerization assistants used may be conventional buffer substances by means of which the pH is brought to, preferably, 6–9, for example sodium bicarbonate and sodium pyrophosphate, and up to 3% by weight of a molecular weight regulator, such as mercaptans, terpinol or α-methylstyrene.

The first graft layer is applied to the grafting base by polymerizing the components of the segments forming the graft layer, in the presence of the grafting base, which is preferably a latex. This is preferably effected in an aqueous emulsion under the same conditions as those described for the preparation of the grafting base.

The application of the graft layer to the grafting base can be effected in one step or in a plurality of steps, the reaction being carried out in five, preferably three, particularly preferably two, steps.

The next graft layers are applied to the copolymer, consisting of grafting base and first graft layer, by polymerizing with one another, in the presence of this copolymer, the components of the segments forming the further graft layer. This is preferably effected in an aqueous emulsion under conditions similar to those described for the preparation of the copolymer comprising grafting base and first graft layer.

It is advantageous to carry out the graft copolymerization of each additional graft layer, for example P2.3, once again in aqueous emulsion in the presence of the graft copolymers consisting of grafting base and two graft layers. However, the graft copolymerization can also be carried out by suspension, mass or solution polymerization. It may be effected in the system of the polymerizations preceding it, it being preferable to add further emulsifier and initiator, which need not correspond to those previously used. The statements made in connection with the preparation of the grafting base are applicable to the choice and combination of emulsifiers.

The novel graft copolymers are obtainable in particular by a process in which the segments forming the grafting base and the corresponding segments forming the graft layers are produced by polymerizing their monomers in succession in an emulsion at from 20 to 90° C., preferably from 55 to 80° C., particularly preferably from 60 to 75° C. It may be particularly preferable according to the invention if the reaction temperatures for the preparation or grafting on of a hard segment are from 20 to 80° C., preferably from 40 to 80° C., particularly preferably from 65 to 80° C. Where a soft segment is prepared or grafted on, it is particularly preferred if the reaction temperature is from 20 to 80° C., preferably from 40 to 70° C., particularly preferably from 60 to 70° C.

The type of phase transition between two segments may be controlled by the amount of residual monomer of the segment polymerized first during the polymerization of the subsequent segment. The higher the proportion of residual monomers, the more diffuse is the phase transition between the two segments.

Furthermore, the novel graft copolymers may be components of blends of graft copolymers and other polymers. In such blends, the novel graft copolymers described above may be present together with other graft copolymers.

These graft copolymers can be prepared by a method known per se, as described, for example, in U.S. Pat. No. 3,055,895 and DE-B-1 260 135.

The graft copolymers (P4) contained in the blend in addition to the graft copolymers described above contain from 30 to 90, preferably from 35 to 80, particularly preferably from 40 to 75, % by weight, based on the total amount of the segments, of at least one elastomeric soft segment (P4.1) as a grafting base comprising a material having a glass transition temperature of not more than 0° C., preferably not more than −20° C. The rubber used is preferably a crosslinked acrylate polymer having a glass transition temperature of less than 0° C., preferably less than −20° C. However, crosslinked polydienes, such as polybutadiene, polyisoprene and polynorbornadiene, or crosslinked silicone rubbers, such as polydimethylsiloxane, or crosslinked ethene/propene/diene terpolymers may also be used as rubber component.

The soft segment forming the grafting base (P4.1) contains at least

P4.1.1) from 50 to 99.9, preferably from 55 to 99, particularly preferably from 60 to 99, % by weight of at least one alkyl acrylate, diene or dialkylsiloxane, P4.1.2) from 0.1 to 10, preferably from 0.5 to 5, particularly preferably from 1 to 3, % by weight of at least one crosslinking agent and P4.1.3) from 0 to 49.9, preferably from 0 to 45, particularly preferably from 0 to 40, % by weight of a further monomer P4.1.3 copolymerizable with the monomers P4.1.1, where the sum of the percentages by weight of P4.1.1 to P4.1.3 should be 100.

Particularly suitable monomers P4.1.1 are acrylates where the alkyl radical is of 1 to 8, preferably 2 to 8, carbon atoms. n-Butyl acrylate and ethylhexyl acrylate are especially suitable. Either one acrylate or a plurality of different acrylates may be used.

The crosslinking agents P4.1.2 used are compounds having two or more functional groups. Where the functional groups are groups having about the same reactivity, the monomers P4.1.2 are conventional crosslinking agents. Preferred crosslinking agents here are monomers which contain at least two ethylenic double bonds capable of copolymerization. These are, for example, divinylbenzene, diallyl maleate, diallyl fumarate, diallyl phthalate, allyl methacrylate, triallyl cyanurate, triallyl isocyanurate and acrylates of polyhydric alcohols, for example ethylene glycol di(meth)acrylate. The acrylate of tricyclodecenyl alcohol has proven a particularly advantageous crosslinking monomer (cf. DE-B-12 60 135).

If the crosslinking agents have functional groups of different reactivity, these monomers P4.1.2 have not only crosslinking but also graft-linking activity. Either only one monomer P4.1.2 or a plurality of different monomers P4.1.2 may be used.

Examples of preferred monomers P4.1.3 are hydroxyalkyl acrylates, (meth)acrylic acid, methyl methacrylate, phenoxyethyl acrylate, isoprene, butadiene, styrene, acrylonitrile, methacrylonitrile and vinyl alkyl ethers where the alkyl radical is of 1 to 8 carbon atoms, for example vinyl methyl ether, vinyl ethyl ether or vinyl propyl ether. Particularly preferred monomers P4.1.3 are butadiene and styrene. Either only one monomer P4.1.3 or a plurality of different monomers P4.1.3 may be used.

The graft copolymers used as components of the blend may be prepared by known processes (cf. inter alia DE-B-12 60 135, DE-A-23 11 129, DE-A-28 26 925, EP-A-81 761, EP-A-450 485 and U.S. Pat. No. 3,691,260). For this purpose, the soft segment P4.1 is first prepared as a grafting base. At least the acrylates P4.1.1 and at least one polyfunctional monomer P4.1.2 and, if required, at least one further monomer P4.1.3 are polymerized in aqueous emulsion at 20–100° C., preferably 50–80° C., as the grafting base. The conventional emulsifiers, for example alkali metal salts of alkylsulfonic or alkylarylsulfonic acids, alkylsulfates, fatty alcohol sulfonates, salts of higher fatty acids of 10 to 30 carbon atoms or resin soaps, may be used. The potassium or sodium salts of alkanesulfonates or of fatty acids of 10 to 18 carbon atoms are preferably used for this purpose. It is advantageous to use the emulsifiers in an amount of 0.1–5, preferably 0.2–2, % by weight, based on the total weight of the monomers used for the preparation of the grafting base.

In general, the procedure is carried out at a water/monomer ratio of from 2:1 to 0.7:1. The polymerization initiators used are in particular conventional persulfates, for example potassium peroxodisulfate; however, redox systems are also suitable. The amount of initiators (eg. 0.1–2.5% by weight, based on the total weight of the monomers) depends in a known manner on the desired molecular weight.

The polymerization assistants used may be conventional buffer substances by means of which the pH is brought to, preferably, 6–9, for example sodium bicarbonate and sodium pyrophosphate, and up to 3% by weight of a molecular weight regulator, for example mercaptans, terpinol or dimeric α-methylstyrene.

Furthermore, the graft copolymers present in the novel blends may contain 5–50, preferably 5–35, particularly preferably 10–30, % by weight, based on the total amount of the segments, of a first graft layer comprising a hard segment (P4.2) of a material having a glass transition temperature of at least 25° C., preferably at least 80° C.

The hard segment forming the first graft layer (P4.2) contains

P4.2.1) 50–100, preferably 65–100, % by weight of at least one vinylaromatic monomer, P4.2.2) 0–20, preferably 0–5, % by weight of at least one crosslinking agent and P4.2.3) 0–50, preferably 0–35, % by weight of at least one monomer copolymerizable with P4.2.1, where the sum of the percentages by weight of P4.2.1 to P4.2.3 should be 100.

The graft layer comprising the hard segment P4.2 is applied to the grafting base comprising the soft segment P4.1 preferably by polymerizing the monomers P4.2.1 and, if required, P4.2.2 and P4.2.3 with one another in the presence of a grafting base in the form of a latex and comprising the soft segment.

First, a vinylaromatic monomer P4.2.1 is polymerized in the presence of the latex of the soft segment P4.1 comprising the crosslinked acrylate polymer. Examples of vinylaromatic monomers P4.2.1 are styrene, α-methylstyrene and styrenes alkylated on the nucleus, for example p-methylstyrene and tert-butylstyrene. Styrene, α-methylstyrene and p-methylstyrene are particularly preferably used. It is advantageous to carry out this graft copolymerization of the monomers P4.2.1 and, if required, P4.2.2 and P4.2.3 on the soft segment P4.1 in the form of a crosslinked polymer and serving as the grafting base once again in aqueous emulsion under the conventional, abovementioned conditions. The graft copolymerization can advantageously be effected in the same system as the emulsion polymerization for the preparation of the soft segment forming the grafting base, and, if necessary, further emulsifier and initiator may be added. The monomers P4.2.1 and, if required, P4.2.2 and P4.2.3 to be grafted on can be added to the reaction mixture all at once, batchwise in a plurality of steps or, preferably, continuously during polymerization. The graft copolymerization of the monomer P4.2.1 in the presence of the grafting base formed from the soft segment P4.1 is carried out in such a way that a degree of grafting, defined as the quotient of the percentage by weight of graft layer and the sum of the percentages by weight of grafting base and graft layers times 100, of 2.5–30, preferably 5–25, results in the graft copolymer.

The same monomers as those referred to above as monomers P4.1.2 in the preparation of the grafting base comprising the soft segment may be used as monomers P4.2.2 having two or more functional groups.

The term polymerizable monomers P4.2.3 for the hard segment is to be understood as meaning the monomers mentioned below, for example acrylonitrile, methacrylonitrile, methyl methacrylate, n-butyl acrylate, tert-butyl acrylate, α-methylstyrene, p-methylstyrene and tert-butylstyrene.

In addition, the graft copolymers present in the novel blend contain 5–50, preferably 15–45, particularly preferably 15–40, % by weight based on the total amount of segments, of, preferable, at least one further graft layer P4.3. The second graft layer P4.3, a hard segment, consists of a material having a glass transition temperature of at least 25° C., in particular at least 80° C.

The hard segment (P4.3) forming the second graft layer contains

P4.3.1) 1–99, preferably 60–90, % by weight of at least one vinylaromatic monomer and P4.3.2) 1–99, preferably 10–40, % by weight of at least one copolymerizable ethylenically unsaturated monomer, where the sum of the percentages by weight of P4.3.1 and P4.3.2 should be 100.

Furthermore, the sum of the percentages by weight of P4.1 to P4.3 should be 100.

The second graft layer P4.3 is applied to the first graft layer P4.2 preferably by carrying out preparation of the second graft layer preferably in the same system as that in which the soft segment P4.1 forming the grafting base and the hard segment P4.2 forming the first graft layer have been prepared. If necessary, further emulsifier and initiator may be added. The monomer mixture to be grafted onto the first graft layer and comprising, for example, styrene and acrylonitrile can be added to the reaction mixture all at once, batchwise in a plurality of steps or, preferably, continuously during polymerization. The graft copolymerization of this mixture in the presence of the grafting base comprising soft segment P4.1 and of the first graft layer comprising hard segment P4.2 is preferably carried out so that a degree of grafting of 10–55, in particular 15–45, % by weight results in the graft copolymer P4.

The application of the second graft layer comprising hard segment P4.3 is usually carried out by a polymerization process similar to that carried out in the preparation of the grafting base comprising soft segment P4.1 and of the first graft layer comprising hard segment P4.2. Regarding the polymerization conditions to be maintained, solvents, emulsifiers and initiators, reference may be made to the statements in connection with the grafting base comprising soft segment P4.1 and the first graft layer comprising hard segment P4.2. If necessary, further emulsifier and initiator may be added.

The same monomers as those referred to above as vinylaromatic monomers P4.2.1 in the preparation of the first graft layer comprising hard segment P4.2 may be used as vinylaromatic monomers of the second graft layer comprising hard segment P4.3. Either only one monomer or a plurality of different monomers may be used.

Examples of copolymerizable, ethylenically unsaturated monomers P4.3.2 for the hard segment P4.3 forming the second graft layer are acrylonitrile, methacrylonitrile and acrylic acid and methacrylates where the alkyl radical is of 1 to 4 carbon atoms. Acrylonitrile, methacrylonitrile and tert-butyl acrylate and mixtures thereof are preferred. Here too, either one monomer P4.3.2 or a plurality of different monomers P4.3.2 may be used.

The application of the hard segment P4.3 forming the second graft layer is preferably effected by graft copolymerization with a monomer mixture comprising at least one vinylaromatic monomer P4.3.1 and at least one ethylenically unsaturated, copolymerizable monomer P4.3.2 in a ratio of from 90:10 to 60:40, in particular from 75:25 to 65:35.

A novel blend M1 preferably contains the graft copolymers P4 and P1.

An embodiment of the blend M1 comprises graft copolymers P4 having an average particle size ($d_{50}$) of 40–200 nm, preferably 50–150 nm, particularly preferably 60–120 nm, and graft copolymers P1 having an average particle size ($d_{50}$) of 250–2000 nm, preferably 350–1000 nm, particularly preferably 400–800 nm.

A further embodiment of the blend M1 comprises graft copolymers P4 having an average particle size ($d_{50}$) of 250–2000 nm, preferably 350–1000 nm, particularly preferably 400–800 nm, and graft copolymers P1 having an average particle size ($d_{50}$) of 40–200 nm, preferably 50–150 nm, particularly preferably 60–120 nm.

In a further embodiment of the blend M1, both the graft copolymers P4 and the graft copolymers P1 have an average particle size ($d_{50}$) of 40–200 nm, preferably 50–150 nm, particularly preferably 60–120 nm.

Another embodiment of the blend M1 comprises graft copolymers P4 and P1 having an average particle size ($d_{50}$) of 250–2000 nm, preferably 350–1000 nm, particularly preferably 400–800 nm.

A novel blend M2 preferably contains the graft copolymers P4 and P2.

An embodiment of such a blend M2 contains graft copolymers P4 having an average particle size ($d_{50}$) of 40–200 nm, preferably 50–150 nm, particularly preferably 60–120 nm, and graft copolymers P2 having an average particle size ($d_{50}$) of 250–2000 nm, preferably 350–1000 nm, particularly preferably 400–800 nm.

A further embodiment of the blend M2 contains graft copolymers P4 having an average particle size ($d_{50}$) of 250–2000 nm, preferably 350–1000 nm, particularly preferably 400–800 nm, and graft copolymers P2 having an average particle size ($d_{50}$) of 40–200 nm, preferably 50–150 nm, particularly preferably 60–120 nm.

Another embodiment of the blend M2 comprises graft copolymers P4 and graft copolymers P2 which each have an average particle size ($d_{50}$) of 40–200 nm, preferably 50–150 nm, particularly preferably 60–120 nm.

A further embodiment of the blends M2 contains graft copolymers P4 and graft copolymers P2 which each have an average particle size ($d_{50}$) of 250–2000 nm, preferably 350–1000 nm, particularly preferably 400–800 nm.

A further novel blend M3 preferably contains the graft copolymers P4 and P3.

An embodiment of the blends M3 contains graft copolymers P4 having an average particle size ($d_{50}$) of 40–200 nm, preferably 50–150 nm, particularly preferably 60–120 nm, and graft copolymers P3 having an average particle size ($d_{50}$) of 250–2000 nm, preferably 350–1000 nm, particularly preferably 400–800 nm.

Another embodiment of the blend M3 comprises graft copolymers P4 having an average particle size ($d_{50}$) of 250–2000 nm, preferably 350–1000 nm, particularly preferably 400–800 nm, and graft copolymers P3 having an average particle size ($d_{50}$) of 40–200 nm, preferably 50–150 nm, particularly preferably 60–120 nm.

Other embodiments of the blends M3 comprise graft copolymers P4 and P3 which each have an average particle size ($d_{50}$) of 40–200 nm, in particular 50–150 nm, particularly preferably 60–120 nm.

Furthermore, an embodiment of the blends M3 contains graft copolymers P4 and P3 which each have an average particle size ($d_{50}$) of 250–2000 nm, preferably 350–1000 nm, particularly preferably 400–800 nm.

Further graft copolymers P5 which are preferably used in the novel blends M3 comprising graft copolymers and, just as in the case of the graft copolymer P4, are preferably particulate and have a core-shell morphology contain P5.1) 30–90, preferably 35–80, particularly preferably 40–75, % by weight of a soft segment which corresponds to the soft segment P4.1 forming the grafting base in graft copolymers P4 and P5.2) 10–70, preferably 20–65, particularly preferably 25–60, % by weight of a graft layer which corresponds to the hard segment P4.3 of the second graft layer of the graft copolymers P4.

A novel blend M4 preferably contains the graft copolymers P5 and P1.

An embodiment of the blend M4 comprises graft copolymers P5 having an average particle size ($d_{50}$) of 40–200 nm, preferably 50–150 nm, particularly preferably 60–120 nm, and graft copolymers P1 having an average particle size ($d_{50}$) of 250–2000 nm, preferably 350–1000 nm, particularly preferably 400–800 nm.

A further embodiment of the blend M4 comprises graft copolymers P5 having an average particle size ($d_{50}$) of 250–2000 nm, preferably 350–1000 nm, particularly preferably 400–800 nm, and graft copolymers P1 having an average particle size ($d_{50}$) of 40–200 nm, preferably 50–150 nm, particularly preferably 60–120 nm.

In a further embodiment of the blend M4, both the graft copolymers P5 and the graft copolymers P1 have an average particle size ($d_{50}$) of 40–200 nm, preferably 50–150 nm, particularly preferably 60–120 nm.

Another embodiment of the blend M4 comprises graft copolymers P5 and P1 having an average particle size ($d_{50}$) of 250–2000 nm, preferably 350–1000 nm, particularly preferably 400–800 nm.

A novel blend M5 preferably contains graft copolymers P5 and P2.

An embodiment of such a blend M5 contains graft copolymers P5 having an average particle size ($d_{50}$) of 40–200 nm, preferably 50–150 nm, particularly preferably 60–120 nm, and graft copolymers P1 having an average particle size ($d_{50}$) of 250–2000 nm, preferably 350–1000 nm, particularly preferably 400–800 nm.

A further embodiment of the blend M5 contains graft copolymers P5 having an average particle size ($d_{50}$) of 250–2000 nm, preferably 350–1000 nm, particularly preferably 400–800 nm, and graft copolymers P2 having an average particle size ($d_{50}$) of 40–200 nm, preferably 50–150 nm, particularly preferably 60–120 nm.

Another embodiment of the blend M5 comprises graft copolymers P5 and graft copolymers P2 which each have an average particle size ($d_{50}$) of 40–200 nm, preferably 50–150 nm, particularly preferably 60–120 nm.

A further embodiment of the blends M5 contains graft copolymers P5 and graft copolymers P2 which each have an average particle size ($d_{50}$) of 250–2000 nm, preferably 350–1000 nm, particularly preferably 400–800 nm.

A further novel blend M6 preferably contains the graft copolymers P5 and P3.

An embodiment of the blends M6 contains graft copolymers P5 having an average particle size ($d_{50}$) of 40–200 nm, preferably 50–150 nm, particularly preferably 60–120 nm, and graft copolymers P3 having an average particle size ($d_{50}$) of 250–2000 nm, preferably 350–1000 nm, particularly preferably 400–800 nm.

Another embodiment of the blend M6 comprises graft copolymers P5 having an average particle size ($d_{50}$) of 250–2000 nm, preferably 350–1000 nm, particularly preferably 400–800 nm, and graft copolymers P3 having an average particle size ($d_{50}$) of 40–200 nm, preferably 50–150 nm, particularly preferably 60–120 nm.

Other embodiments of the blends M6 comprise graft copolymers P5 and P3 which each have an average particle size ($d_{50}$) of 40–200 nm, in particular 50–150 nm, particularly preferably 60–120 nm.

Furthermore, an embodiment of the blends M6 contains graft copolymers P5 and P3 which each have an average particle size ($d_{50}$) of 250–2000 nm, preferably 350–1000 nm, particularly preferably 400–800 nm.

The graft copolymers present in the novel blends may have either a narrow or a broad particle size distribution. However, they preferably have a narrow particle size distribution. Particularly preferred novel blends comprise graft copolymers which have a Q value of 0.3 or less, in particular 0.1 or less.

In the preparation process leading to the novel blends of graft copolymers, essentially the two graft copolymers are mixed with one another in a conventional extruder at 200–300° C., in particular 220–280° C., and in an average residence time of 0.1–100, preferably 0.5–5, particularly preferably 0.5–3, minutes.

The novel graft copolymers, in particular graft copolymers P1 to P3, and/or blends M1 to M5 can be used for thermoplastic materials, in particular for the preparation thereof.

The novel graft copolymers, in particular graft copolymers P1 to P3, and/or the novel blends M1 to M5 may be used both alone and as a blend with other graft copolymers or copolymers. They are suitable as impact modifiers for thermoplastic materials. The novel graft copolymers and/or blends are particularly suitable as impact modifiers for thermoplastics which have a glass transition temperature of at least 25° C., preferably at least 60° C., particularly preferably at least 80° C. Examples are polyvinyl chloride (PVC), polymethyl methacrylate and copolymers of vinylaromatic monomers and polar copolymerizable ethylenically unsaturated monomers and blends thereof.

Particularly preferred copolymers are styrene/acrylonitrile copolymers or α-methylstyrene/acrylonitrile copolymers. In addition, the thermoplastic, likewise novel materials may contain other thermoplastics, in particular polycarbonates.

The preferred thermoplastic materials (T1) include those which contain i) 0–95, preferably 5–90, % by weight of at least one of the graft copolymers P1 to P5, preferably P1 to P3, and/or at least one of the blends M1 to M6, ii) 0–90, preferably 5–90, % by weight of at least one graft copolymer and/or blend differing from i, iii) 5–95, preferably 5–90, % by weight of at least one copolymer comprising iii.1) 50–100% by weight of at least one vinylaromatic monomer, $C_1$–$C_{18}$-alkyl acrylate, $C_1$–$C_{18}$-alkyl methacrylate or a mixture thereof and iii.2) 0–50% by weight of acrylonitrile, methacrylonitrile, maleic anhydride, and an N-substituted maleimide or a mixture thereof, where the sum of the percentages by weight of iii.1 and iii.2 should be 100, iv) 0–90% by weight of at least one polycarbonate and v) 0–50% by weight of additives, where the sum of the percentages by weight of i to v should be 100.

According to a preferred embodiment, thermoplastic materials contain 10–70% by weight of at least one graft copolymer P4 or P5 (component i.1), 10–70% by weight of at least one graft copolymer P1 to P3 (component i.2), 20–89.9% by weight of at least one copolymer iii and 0.1–20% by weight of additives v.

According to another preferred embodiment, the thermoplastic materials contain 5–50% by weight of one of the graft copolymers P4 and P5, 5–70% by weight of one of the graft copolymers P1 to P3 and 20–84.5% by weight of the copolymer iii, 5–60% by weight of the polycarbonate iv and 0.1–20% by weight of additives. The stated percentages by weight are based in each case on the sum of the components i–v.

The processing is carried out by extrusion, kneading or milling all components i–v in a conventional apparatus, for example in an extruder, kneader, roll mill or milling apparatus, the components being processed in any desired sequence.

The graft copolymers P1 to P5 can be used in any desired combination or alone as materials. For this purpose, they can be worked up, for example, by spray-drying.

Preferred graft copolymers ii are composed of a grafting base comprising a material having a glass transition temperature of at least 25° C., preferably at least 80° C., in particular 80–130° C., ie. a hard, nonresilient material. These graft copolymers ii contain three or more graft layers, preferably not more than three.

Particularly preferred graft copolymers ii contain ii.1) 5–90% by weight of a grafting base comprising a material having a glass transition temperature of at least 25° C., containing at least
 ii.1.1) 50–99.9% by weight of at least one vinylaromatic monomer,
 ii.1.2) 0–49.9% by weight of at least one monomer copolymerizable with ii.1.1 and
 ii.1.3) 0.1–10% by weight of at least one crosslinking agent and
ii.2) 4.9–90% by weight of a graft layer comprising a material having a glass transition temperature of not more than 0° C., containing
 ii.2.1) 50–100% by weight of at least one $C_1$–$C_{18}$-alkyl acrylate, diene or dialkylsiloxane,
 ii.2.2) 0–50% by weight of at least one monomer copolymerizable with the monomers ii.2.1 and
 ii.2.3) 0–20% by weight of at least one crosslinking agent and
ii.3) 0.1–85% by weight of a second graft layer comprising a material having a glass transition temperature of at least 25° C., containing
 ii.3.1) 50–100% by weight of at least one vinylaromatic monomer,
 ii.3.2) 0–50% by weight of at least one monomer copolymerizable with the monomer ii.3.1 and
 ii.3.3) 0–20% by weight of at least one crosslinking agent and
ii.4) 5–90% by weight of a third graft layer comprising a material having a glass transition temperature of at least 25° C., containing
 ii.4.1) 1–99% by weight of at least one vinylaromatic monomer and
 ii.4.2) 1–99% by weight of at least one monomer copolymerizable with the monomer ii.4.1), where the sums of the percentages by weight of the individual groups of components should be 100 in each case.

Particularly preferred graft copolymers ii contain
5–20% by weight of ii.1,
40–65% by weight of ii.2,
10–25% by weight of ii.3 and
10–40% by weight of ii.4,
the sum of the components ii.1 to ii.4 being 100.

The grafting base ii.1 is preferably composed of 60–99.8, in particular 70–99.5, % by weight of ii.1.1, 0–39.8, in particular 0–29.5, % by weight of ii.1.2 and 0.1–10, in particular 0.5–3, % by weight of ii.1.3.

Other preferred components ii are the graft copolymers P4 and P5.

Regarding the choice of monomers and crosslinking agents and the preparation process, particle diameters and Q values, the above statements in connection with soft and hard segments having a similar composition are applicable. The graft copolymers ii can be prepared by methods known per se, so that reference is made here, for example, to EP-A-450 485.

As a rule, materials which contain only the components i and ii form a bimodal particle mixture.

In addition to the components i and ii, materials may contain, as component iii, one or more copolymers in amounts of preferably 5–95% by weight, based on the components i to v. Preferred molding materials contain 20–79.9, in particular 40–74.9, % by weight, based on the components i to v, of component iii.

Preferred copolymers contain 60–80% by weight, based on the components iii.1 and iii.2, of monomers iii.1 and 20–40% by weight, based on the components iii.1 and iii.2, of monomers iii.2.

Preferred copolymers iii are those which comprise at least one monomer from the group consisting of styrene, α-methylstyrene, styrenes substituted on the nucleus, such as p-methylstyrene, methyl methacrylate, copolymerized with at least one monomer from the group consisting of acrylonitrile, methacrylonitrile and maleic anhydride.

Particularly preferred copolymers iii are those comprising styrene, acrylonitrile and, if required, methyl methacrylate. Other particularly preferred copolymers iii contain α-methylstyrene, acrylonitrile and, if required, methyl methacrylate. Copolymers iii comprising styrene, α-methylstyrene and acrylonitrile and, if required, methyl methacrylate are also particularly preferred. Furthermore, copolymers of styrene and maleic anhydride are among the particularly preferred copolymers iii. The copolymers iii are as a rule resin-like, thermoplastic and rubber-free.

The copolymers iii are known per se or can be prepared by methods known per se, for example free radical polymerization, in particular by emulsion, suspension, solution or mass polymerization. They have in general viscosity numbers of 40–60, preferably 60–100, ml/g. This corresponds to weight average molecular weights Mw of from 1500 to 200,000 g/mol.

The copolymers iii are also frequently formed as byproducts in the graft copolymerization for the preparation of the novel graft copolymers P1 to P5, particularly when large amounts of monomers are grafted onto small amounts of grafting base.

The materials may contain 0–90, preferably 0–80, % by weight of at least one polycarbonate as component iv.

The polycarbonates iv are known per se and are described in the literature.

These polycarbonates can preferably be prepared by reacting carbonic acid derivatives, such as phosgene or diphenyl carbonate, with diphenols. It is in principle possible to use all diphenols, as stated, for example, in the monograph by H. Schnell, Chemistry and Physics of Polycarbonates, Interscience Publishers, 1964, and in U.S. Pat. No. 2,999,835 and DE-A-22 48 817.

Dihydroxybiphenyl, di(hydroxyphenyl)alkanes and di(hydroxyphenyl) ethers and mixtures thereof are particularly preferred diphenols.

Suitable diphenols are, for example, 1,3-dihydroxybenzene, 1,4-dihydroxybenzene, 2,6-dihydroxynaphthalene, di(4-hydroxyphenyl)methane, 1,1-di(4'-hydroxyphenyl)ethane, 2,2-di(4'-hydroxyphenyl)propane (bisphenol A), 2,2-di(3'-chloro-4'-hydroxyphenyl)propane, 2,2-di(3',5'-dichloro-4'-hydroxyphenyl)propane, 2,2-di(3',5'-dibromo-4'-hydroxyphenyl)propane, 2,2-di(3',5'-dimethyl-4'-hydroxyphenyl)propane, 2,4-di(4'-hydroxyphenyl)-2-methylbutane, di(4'-hydroxyphenyl)pentane, 1,1-di(4'-hydroxyphenyl)cyclohexane 4,4'-dihydroxydiphenyl sulfone, 4,4'-dihydroxydiphenyl sulfite and 4,4'-dihydroxydiphenyl ether.

A particularly preferred diphenol is bisphenol A or a mixture thereof with other diphenols. The amount of bisphenol A in such mixtures is in general 70–98% by weight.

Both homopolymers and copolymers of mixtures of different diphenols may be used. Block copolymers, such as diorganosiloxane-containing polycarbonates, may also be used.

The polycarbonates iv can be branched by incorporating small amounts, for example from 0.05 to 2 mol %, based on the sum of the diphenols used, of trifunctional compounds or compounds having a functionality of more than three, such as those having three or more phenolic OH groups.

Processes for the preparation of polycarbonates iv are known per se. Thus, the polycarbonates can be prepared, for example, in the heterogeneous phase, ie. by the phase boundary method, or in the homogeneous phase, ie. by the pyridine method. Processes for the preparation of polycarbonate are described, for example, in DE-A-22 48 817, 13 00 266, 14 95 739 and 33 34 782 and U.S. Pat. No. 2,999,835.

The relative viscosity of the polycarbonates iv is in general 1.2–1.5, preferably 1.28–1.4, dl/g, measured in 0.5% strength by weight solution in dichloromethane at 25° C.

The thermoplastic materials may contain additives as component v. The amount thereof is in general 0–50, preferably 0.1–20, % by weight, based on the total weight of the components i to v.

Examples of conventional additives are glass fibers, flameproofmg agents, stabilizers and antioxidants, heat stabilizers and UV stabilizers, lubricants and mold release agents, dyes and pigments and plasticizers.

Glass fibers comprising E, A or C glass may be used. In general, the glass fibers are provided with a size and an adhesion promoter. The diameter of the glass fibers is in general from 6 to 20 μm. Both rovings and chopped glass fibers having a length of 1–10 mm, preferably 3–6 mm, may be incorporated.

Pigments and dyes are generally present in amounts of up to 6, preferably 0.5–5, in particular 0.5–3, % by weight, based on the components i to v.

The pigments for coloring thermoplastics are generally known, cf. for example R. Gächter and H. Müller, Taschenbuch der Kunststoffadditive, Carl Hanser Verlag, 1983, pages 494–510. A first preferred group of pigments comprises white pigments, for example zinc oxide, zinc sulfide, lead white (2 $PbCO_3 \cdot Pb(OH)_2$), lithopone, antimony white and titanium dioxide. Among the two most commonly used crystal modifications (rutile and anatase types) of titanium dioxide, the rutile form is particularly used for imparting whiteness to the molding materials.

Black pigments which may be used are, for example, iron oxide black ($Fe_3O_4$), spinet black ($Cu(Cr,Fe)_2O_4$), manganese black (mixture of manganese dioxide, silica and iron oxide), cobalt black and antimony black and particularly preferably carbon black, which is generally used in the form of furnace black or gas black (in this context, see G. Benzing, Pigmente für Anstrichmittel, Expert-Verlag (1988), page 78 et seq.).

It is of course possible to use inorganic colored pigments, such as chrome oxide green, or organic colored pigments, such as azo pigments or phthalocyanines, for establishing certain hues. Such pigments are in general commercially available.

Antioxidants and heat stabilizers which may be added to the novel thermoplastic materials are, for example, halides of metals of group I of the Periodic Table, for example, sodium, potassium and lithium halides, if necessary in combination with copper(I) halides, for example chlorides, bromides or iodides. The halides, in particular of copper, may also contain electron-rich π ligands. Examples of such copper complexes are copper halide complexes with, for example, triphenylphosphine. Zinc fluoride or zinc chloride may also be used. Furthermore, sterically hindered phenols, hydroquinones, substituted members of this group, secondary aromatic amines, if necessary in combination with phosphorus-containing acids, for example salts thereof, and mixtures of these compounds may be used, preferably in concentrations of up to 1% by weight, based on the components i to v.

Examples of UV stabilizers are various substituted resorcinols, salicylates, benzotriazoles and benzophenones, which are used in general in amounts of up to 2% by weight, based on the components i to v.

Lubricants and mold release agents, which are added as a rule in amounts of up to 1% by weight, based on the thermoplastic material, are stearic acid, stearyl alcohol, alkyl stearates and stearamides as well as esters of pentaerythritol with long-chain fatty acids. Salts of calcium, of zinc or of aluminum with stearic acid and dialkyl ketones, for example distearyl ketone, may also be used.

Examples of plasticizers are dialkyl phthalates, for example dioctyl phthalate.

The materials which are likewise thermoplastic may be prepared by methods known per se, by mixing the components in a conventional mixing apparatus, for example an extruder, a Brabender mill or a Banbury mill, and then carrying out extrusion. After the extrusion, the extrudate is cooled and comminuted. The thermoplastic materials have high impact strength, in particular at low temperatures. At the same time, the thermoplastic materials have high resistance to weathering and to aging. Moreover, they can be readily colored.

They can be processed to give moldings, films, coatings or fibers. They can also be applied, for example by means of known coextrusion methods, in the form of layers (preferably in layer thicknesses of from 100 μm to 10 mm) to surfaces, preferably thermoplastics, such as styrene/acrylonitrile copolymers, acrylonitrile/butadiene/styrene terpolymers (ABS), polystyrene, high impact polystyrene (HIPS) or PVC. The materials can be used, for example, in the automotive sector, in the household sector and for leisure articles. Thus, they can be processed, for example, to automotive parts, road signs, window profiles, lamp coverings, garden furniture, boats, surfboards or toys. One embodiment preferred according to the invention is the graft copolymer P1 which has a defined core-shell morphology and contains the following:

P1.1) from 1 to 95% by weight of a grafting base comprising a material having a glass transition temperature of at least 25° C., composed of P1.1.1) from 50 to 99.8% by weight of at least one vinylaromatic monomer, P1.1.2) from 0 to 49.8% by weight of at least one monomer copolymerizable with the monomers P1.1.1, P1.1.3) from 0.1 to 25% by weight of a crosslinker component comprising
- α) from 0.1 to 100% by weight of di-hydrodicyclopentadienyl acrylate and
- β) from 0 to 99% by weight of at least one further crosslinking agent having two or more functional groups of different reactivity and P1.1.4) from 0.1 to 25% by weight of at least one crosslinking agent having two or more functional groups of the same reactivity and P1.2) from 5 to 99% by weight of a graft layer comprising a material having a glass transition temperature of not more than 0° C., which in turn is composed of P1.2.1) from 50 to 100% by weight of at least one acrylate, P1.2.2) from 0 to 50% by weight of at least one monomer copolymerizable with the monomers P1.2.1 and P1.2.3) from 0 to 20% by weight of at least one crosslinking agent α or β or a mixture thereof.

A further preferred embodiment is the graft copolymer P2. This graft copolymer has a defmed core-shell morphology and comprises the following components:

P2.1) from 1 to 95% by weight of a grafting base comprising a material having a glass transition temperature of at least 25° C. and an average particle size ($d_{50}$) of at least 150 nm, which once again is composed of P2.1.1) from 50 to 99.8% by weight of at least one vinylaromatic monomer, P2.1.2) from 0 to 49.8% by weight of at least one monomer copolymerizable with the monomers P1.1.1, P2.1.3) from 0.1 to 25% by weight of a crosslinker component comprising
- α) from 0.1 to 100% by weight of di-hydrodicyclopentadienyl acrylate and
- β) from 0 to 99% by weight of at least one further crosslinking agent having two or more functional groups of different reactivity and P2.1.4) from 0.1 to 25% by weight of at least one crosslinking agent having two or more functional groups of the same reactivity and P2.2) from 4.9 to 98.9% by weight of a graft layer comprising a material having a glass transition temperature of not more than 0° C., which once again is composed of P2.2.1) from 50 to 100% by weight of at least one acrylate, P2.2.2) from 0 to 50% by weight of at least one monomer copolymerizable with the monomers P1.2.1 and P2.2.3) from 0 to 20% by weight of at least one crosslinking agent α or β or a mixture thereof and P2.3) from 0.1 to 90% by weight of at least one further graft layer.

Further embodiments, preferred according to the invention, of the graft copolymers P1 and P2 are present when the weight ratio of the crosslinker components P1.1.3 and P2.1.3 to crosslinking agents P1.1.4 and P2.1.4 is from 1:0.5 to 1:3.

Other preferred embodiments of the graft copolymers P1 and P2 are those in which the grafting base P1.1 or P2.1, respectively, has an average particle size ($d_{50}$) of from 200 to 800 nm and the average particle size (weight average) of the total graft copolymers P1 and P2 is from 350 to 2000 nm.

The novel embodiments of the graft copolymers P1 and P2 can preferably be prepared by polymerizing the grafting bases P1.1 and P2.1 and the corresponding graft shells P1.2 and P2.2, respectively, in succession in a one-pot process, the ratio of the feed rates of the monomers P1.1.1 to P1.1.4 or P2.1.1 to P2.1.4 to the monomers P1.2.1 to P1.2.3 or P2.2.1 to P2.2.3 and the ratio of the feed rates of the emulsifiers for P1.1 or P2.1 to those for P1.2 or P2.2 being from 0.5 to 20.

The preferred embodiments of the graft copolymers P1 and P2 stated in the above paragraphs are preferably used as impact modifiers for thermoplastic molding materials.

Preferred embodiments of such thermoplastic materials contain i) from 5 to 95% by weight of at least one graft copolymer of the abovementioned embodiments of P1 or P2, ii) from 0 to 90% by weight of at least one graft copolymer differing from the graft copolymer P1 or P2, iii) from 5 to 95% by weight of at least one copolymer of
- $iii_1$) from 5 to 100% by weight of at least one vinylaromatic monomer, $C_1$–$C_{18}$-alkyl acrylate, $C_1$–$C_{18}$-alkyl methacrylate or a mixture thereof and
- $iii_2$) from 0 to 50% by weight of acrylonitrile, methacrylonitrile, maleic anhydride, an N-substituted maleimide or a mixture thereof, iv) from 0 to 90% by weight of at least one polycarbonate and v) from 0 to 50% by weight of additives.

Further novel embodiments are moldings, films, fibers and coatings which contain the above graft copolymers P1 or P2.

Further embodiments, preferred according to the invention, of graft copolymers have the same composition as P1 and P2, except that P1.1.4 and P2.1.4 are from 0.1 to 25% by weight of divinylbenzene. Particularly preferred embodiments are, however, those in which the graft copolymers P1 and P2 contain from 0.1 to 25% by weight of dihydrodicyclopentadienyl acrylate for P1.1.3 or P2.1.3 and from 0.1 to 25% by weight of divinylbenzene for P1.1.4 or P2.1.4.

Further novel embodiments are the graft copolymers P3, whose composition must contain at least the following:

P3.1) from 0.1 to 5% by weight of a core having a glass transition temperature of not more than 0° C. and an average particle size ($d_{50}$) of up to 120 nm, composed of P3.1.1) from 50 to 99.9% by weight of at least one alkyl acrylate, P3.1.2) from 0 to 50% by weight of at least one monomer P3.1.2 copolymerizable with the monomers P3.1.1 and P3.1.3) from 0.1 to 20% by weight of at least one crosslinking agent, P3.2) from 1 to 90% by weight of a shell comprising a material having a glass transition temperature of at least 25° C. and an average particle size ($d_{50}$) of the core P3.1 and a first shell P3.2 of at least 150 nm, composed of P3.2.1) from 50 to 99.8% by weight of at least one vinylaromatic monomer, P3.2.2) from 0 to 49.8% by weight of at least one monomer P3.2.2 copolymerizable with the monomers P3.2.1, P3.2.3) from 0.1 to 25% by weight of a crosslinker component comprising
- α) from 0.1 to 100% by weight of di-hydrodicyclopentadienyl acrylate and
- β) from 0 to 99.9% by weight of at least one further crosslinking agent having two or more functional groups of different reactivity and P3.2.4) from 0.1 to 25% by weight of at least one crosslinking agent having two or more functional groups of the same reactivity and P3.3) from 4.8 to 98.8% by weight of a second shell comprising a material having a glass transition temperature of not more than 0° C., composed of P3.3.1) from 50 to 99.9% by weight of at least one alkyl acrylate, P3.3.2) from 0 to 50% by weight of at least one monomer P3.3.2 copolymerizable with the monomers P3.3.1 and P3.3.3) from 0.1 to 20% by weight of at least one crosslinking agent and P3.4) from 0.1 to 90% by weight of at least one further shell.

Particularly preferred embodiments of the graft copolymer P3 contain from 1 to 3% by weight of a core P3.1, from 10 to 50% by weight of a first shell P3.2, from 20 to 60% by weight of a second shell P3.3 and from 20 to 67% by weight of at least one further shell P3.4. A further preferred embodiment of the graft copolymer P3 is present when the core P3.1 has a glass transition temperature of not more than −20° C. and an average particle diameter ($d_{50}$) of from 50 to 100 nm.

Further embodiments of the graft copolymers P3 comprise a first shell P3.2 having a glass transition temperature of at least 50° C., the graft copolymer of the core P3.1 and of the first shell P3.2 having an average particle size ($d_{50}$) of from 180 to 500 nm.

In addition, embodiments of the graft copolymers P3 may have a second shell P3.3 having a glass transition temperature of not more than −20° C., the graft copolymer of the core P1 and of the two shells P3.2 and P3.3 having an average particle diameter ($d_{50}$) of from 200 to 750 nm.

The abovementioned novel embodiments P3 may best be prepared by polymerizing, in succession in an emulsion at from 20 to 90° C., the monomers forming the core P3.1 and the shells P3.2, P3.3 and P3.4.

Thermoplastic molding materials preferred according to the invention contain i) from 5 to 95% by weight of at least one graft copolymer P3, ii) from 0 to 90% by weight of at least one graft copolymer ii differing from the graft copolymer i, iii) from 5 to 95 % by weight of at least one copolymer of iii$_1$) from 50 to 100% by weight of at least one vinylaromatic monomer, $C_1$–$C_{18}$-alkyl acrylate, $C_1$–$C_{18}$-alkyl methacrylate or a mixture thereof and iii$_2$) from 0 to 50% by weight of acrylonitrile, methacrylonitrile, maleic anhydride, an N-substituted maleimide or a mixture thereof, iv) from 0 to 90% by weight of at least one polycarbonate and v) from 0 to 50% by weight of additives.

Embodiments of novel moldings, films, fibers or coatings contain graft copolymer P3.

A particularly preferred embodiment of the graft copolymers P3 is present when P3.2.4 comprises from 0.1 to 25% by weight of divinylbenzene.

In a further particularly preferred embodiment of the graft copolymers P3, P3.2.3 comprises from 0.1 to 25% by weight of dihydrodicyclopentadienyl acrylate and P3.2.4 comprises from 0.1 to 25% by weight of divinylbenzene.

A further embodiment preferred according to the invention is the graft copolymer blend M2. The blend M2 contains M2.I) a particulate graft copolymer M2.I, consisting of M2.I.1) from 30 to 90% by weight of at least one elastomeric grafting base M2.I.1 comprising a material having a glass transition temperature of not more than 0° C., composed of M2.I.1.1) from 50 to 99.9% by weight of at least one alkyl acrylate, diene or dialkylsiloxane, M2.I.1.2) from 0.1 to 10% by weight of at least one monomer having two or more functional groups and M2.I.1.3) from 0 to 49.9% by weight of a further monomer M2.I.1.3 copolymerizable with the monomers M2.I.1.1, M2.I.2) from 5 to 50% by weight of a first graft layer comprising a material having a glass transition temperature of at least 25° C., consisting of M2.I.2.1) from 50 to 100% by weight of at least one vinylaromatic monomer, M2.I.2.2) from 0 to 20% by weight of at least one monomer having two or more functional groups and M2.I.2.3) from 0 to 50% by weight of at least one copolymerizable monomer and M2.I.3) from 5 to 50% by weight of a second graft layer comprising a material having a glass transition temperature of at least 25° C. consisting of M2.I.3.1) from 1 to 99% by weight of at least one vinylaromatic monomer and M2.I.3.2) from 1 to 99% by weight of at least one copolymerizable, ethylenically unsaturated monomer, M2.II.) and a graft copolymer M2.II having a defined core-shell morphology, consisting of:

M2.II.1) from 1 to 95% by weight of a grafting base comprising a material having a glass transition temperature of at least 25° C. and an average particle size ($d_{50}$) of at least 150 nm, composed of M2.II.1.1) from 50 to 99% by weight of at least one vinylaromatic monomer, M2.II.1.2) from 0 to 49.8% by weight of at least one monomer copolymerizable with the monomers M2.II.1.1, M2.II.1.3) from 0.1 to 25% by weight of a crosslinker component comprising α) from 0.1 to 100% by weight of dihydrodicyclopentadienyl acrylate and β) from 0 to 99% by weight of at least one further crosslinking agent having two or more functional groups of different re-activity and M2.II.1.4) from 0.1 to 25% by weight of at least one crosslinking agent having two or more functional groups of the same reactivity and M2.II.2) from 4.9 to 98.9% by weight of a graft layer comprising a material having a glass transition temperature of not more than 0° C., composed of M2.II.2.1) from 50 to 100% by weight of at least one alkyl acrylate, M2.II.2.2) from 0 to 50% by weight of at least one monomer copolymerizable with the monomers M2.II.2.1 and M2.II.2.3) from 0 to 20% by weight of at least one crosslinking agent α or β or a mixture thereof and furthermore M2.II.3) from 0.1 to 90% by weight of at least one further graft layer.

In further novel embodiments of the blend M2, the graft copolymer M2.I has an average particle size of from 40 to 200 nm.

In further preferred embodiments of the blends M2, the graft copolymer M2.II has an average particle size ($d_{50}$) of from 250 to 2000 nm.

Furthermore, a novel embodiment of the blend M2 is present if the monomers M2.I.1.2 and M2.I.2.2 are crosslinking agents.

Other novel embodiments of the blends M2 have monomers M2.I.1.2 and M2.I.2.2 which are graft-linking monomers having two or more functional groups of different reactivity.

The abovementioned novel embodiments of the blends M2 can best be prepared by mixing the graft copolymers M2.I and M2.II with one another in an extruder at from 220 to 300° C. and in an average residence time of from 0.5 to 5 minutes.

It is advantageous to use the abovementioned preferred embodiments of the blends M2 as impact modifiers for thermoplastic materials. A further novel embodiment comprises thermoplastic materials which contain the following:
i) from 5 to 90% by weight of at least one graft copolymer M2.I,
ii) from 5 to 90% by weight of at least one graft copolymer M2.II,
iii) from 5 to 95% by weight of at least one copolymer of
    iii$_1$) from 50 to 100% by weight of at least one vinylaromatic monomer, $C_1$–$C_{18}$-alkyl acrylate, $C_1$–$C_{18}$-alkyl methacrylate or a mixture thereof and
    iii$_2$) from 0 to 50% by weight of acrylonitrile, methacrylonitrile, maleic anhydride, an N-substituted maleimide or a mixture thereof,
iv) from 0 to 90% by weight of at least one polycarbonate and
v) from 0 to 50% by weight of additives.

Further embodiments preferred according to the invention are moldings, films and coatings which contain blends M2.

In a further embodiment, the thermoplastic materials and the components present therein, in particular the novel graft copolymers and the blends thereof as well as the components ii and iii, are rubber-free, in particular diene rubber-free, particularly preferably butadiene rubber-free and/or isoprene rubber-free, in order to comply with DIN 16777/2 or ISO06402/1.

EXAMPLES

Testing of Performance Characteristics

The weight average particle sizes ($d_{50}$) were determined by means of an analytical ultracentrifuge according to the method described in W. Scholtan and H. Lange, Kolloid-Z. und Z.-Polymere 250 (1972), 782–796.

The ultracentrifuge measurement gives the integral mass distribution of the particle diameter of the sample. From this it is possible to determine the percentage by weight of the particles which have a diameter equal to or smaller than a certain size. The average particle diameter, which is also referred to as the $d_{50}$ value of the integral mass distribution, is defined as the value at which 50% by weight of the particles have a smaller diameter, and 50% by weight of the particles a larger diameter, than the $d_{50}$ value.

The notched impact strengths ($a_k$ [kJ/m$^2$]) were measured at the stated temperatures according to ISO179/1eA, using standard small bars injection molded and then milled (A notch).

The impact strengths ($a_n$ [kJ/m$^2$]) were measured according to ISO179/1eU, using injection molded standard small bars.

In each case, three sample series which had been produced at different processing temperatures were investigated. The mean value from the testing of 10 samples per sample series is stated in each case.

The viscosity numbers (VN [cm$^3$/g]) were determined in each case in a 0.5% strength by weight solution in dimethylformamide at 23° C. Insoluble gel fractions were removed before the measurement by centrifuging, and the sample weight was corrected accordingly.

ΔE is a measure of the colorability and was determined according to DIN6174.

The ΔE value is calculated from the difference between the opacities of 2 mm thick circular disks injection molded at 200° C., against a white and a black background. If the difference ΔE thus determined is small, this means that the samples are difficult to color.

The gloss was determined according to DIN67530 by a procedure in which light of a certain intensity was directed at the sample at an angle of incidence of 45° and the intensity of the reflected light was measured by means of a photogoniometer.

The Vicat B50 value according to DIN 53460 was determined as a measure of the heat distortion resistance of the samples.

The melt volume index MVI was measured at 220° C. and under an applied force of 10 kp.

The solids contents of the emulsions denote the content of all solids fractions in percent by weight, based on the total mass of the respective emulsion.

| Abbreviations | |
|---|---|
| Polystyrene | PS |
| Dihydrodicyclopentadienyl acrylate | DCPA |
| n-Butanediol diacrylate | BDA |
| Sodium salt of a $C_{12}$–$C_{18}$-paraffin-sulfonic acid | Na salt |
| Potassium peroxodisulfate | KPDS |
| Sodium pyrophosphate | NaPP |
| Graft copolymer | GCP |
| Styrene | S |
| Acrylonitrile | AN |
| Solids content | SC |
| Copolymer of S and AN | PSAN |
| Divinylbenzene | DVB |
| Grafting base | GB |
| First graft layer | 1GL |
| Second graft layer | 2GL |
| Third graft layer | 3GL |
| Hard (property of GB or GL) | H |
| Soft (property of GB or GL) | S |
| Diffuse phase transition at transition from hard grafting base to soft graft layer | ○ |
| Sharp phase transition from hard segment to soft segment | Δ |

I. Preparation of Graft Copolymers and Molding Materials Having a Hard Core

I.1 Preparation of a Polystyrene Seed Latex
(OZ 45942; NAE566/95)

4500 g of water, 30 g of the Na salt of a $C_{12}$–$C_{18}$-paraffinsulfonic acid, 9 g of potassium peroxodisulfate, 12 g of sodium bicarbonate and 1 g of sodium pyrophosphate were heated to 70° C. while stirring and under nitrogen. A mixture of 2940 g of styrene and 40 g of dihydrodicyclopentadienyl acrylate (DCPA) was added in the course of 3 hours. After the end of the monomer addition, the emulsion was kept at 60° C. for a further hour. The PS seed latex thus obtained had an average particle diameter ($d_{50}$) of 80 nm. The solids content of the PS seed latex emulsion was 39.9%.

I.2 Preparation of the Hard Grafting Bases

I.2.1 Grafting Base HGB1
(OZ 45942)

4200 g of water, 3 g of the Na salt of a $C_{12}$-$C_{18}$-paraffinsulfonic acid, 1.75 g of potassium peroxodisulfate, 2.5 g of sodium bicarbonate, 1 g of sodium pyrophosphate and 40 g of the PS seed latex were heated to 65° C. A mixture of 475 g of styrene, 10 g of DCPA and 15 g of BDA was then added in the course of 3 hours. After the end of the monomer addition, the emulsion was kept at 65° C. for a further hour.

The grafting base HGB1 had an average particle diameter ($d_{50}$) of 250 nm.

The emulsion had a solids content of 10.5%.

I.2.2 Grafting Base HGB2

(OZ 45942)

The grafting base HGB2 was prepared similarly to HGB1, except that 490 g of styrene were added and no BDA was present.

The grafting base HGB2 had an average particle diameter ($d_{50}$) of 263 nm.

The emulsion had a solids content of 10.7%.

I.2.3 Grafting Base HGB3

(OZ 45942)

4200 g of water, 6 g of the Na salt of a $C_{12}$–$C_{18}$-paraffinsulfonic acid, 2 g of potassium peroxodisulfate, 3 g of sodium bicarbonate and 1.5 g of sodium pyrophosphate were heated to 65° C. A mixture of 570 g of styrene, 12 g of DCPA and 18 g of BDA was then added in the course of 3 hours. After the end of the monomer addition, the emulsion was kept at 65° C. for a further hour.

The grafting base HGB3 had an average particle diameter ($d_{50}$) of 82 nm.

The emulsion had a solids content of 12.7%.

I.2.4 Grafting Base HGB4

(OZ 45942)

The grafting base HGB4 was prepared similarly to HGB3, except that 588 g of styrene were added and no BDA was present.

The grafting base HGB4 had an average particle diameter ($d_{50}$) of 85 nm.

The emulsion had a solids content of 12.6%.

I.2.5 Grafting Base HGB7

(OZ 45942)

The grafting base HGB7 was prepared similarly to HGB1, except that the mixture of styrene, DCPA and BDA was added in the course of 1 hour. After the end of the reaction, stirring was continued for a further hour at 65° C.

The grafting base HGB7 had an average particle diameter ($d_{50}$) of 245 nm.

The emulsion had a solids content of 8.9%.

I.2.6 Grafting Base HGB8

(NAE 566/95)

4200 g of water, 3 g of the Na salt of a $C_{12}$-to $C_{18}$-paraffinsulfonic acid, 1.75 g of potassium peroxodisulfate, 2.5 g of sodium bicarbonate, 1 g of sodium pyrophosphate and 40 g of the PS seed latex were heated to 65° C. A mixture of 482.5 g of styrene, 10 g of DCPA and 7.5 g of DVB was then added in the course of 3 hours. After the end of the monomer addition, the emulsion was kept at 65° C. for a further hour.

The grafting base HGB8 had an average particle diameter ($d_{50}$) of 210 nm.

The emulsion had a solids content of 6.8%.

I.2.7 Grafting Base HGB9

2450 g of water, 3 g of the sodium salt of a $C_{12}$-to $C_{18}$-paraffinsulfonic acid, 1.5 g of potassium peroxodisulfate, 2.4 g of sodium bicarbonate, 1 g of sodium pyrophosphate and 53 g of the polystyrene seed latex were heated to 65° C. A mixture of 590 g of styrene, 12 g of DCPA and 9.2 g of DVB was then added in the course of 3 hours. After the end of the monomer addition, the emulsion was kept at 65° C. for a further hour.

The grafting base HGB9 had an average particle diameter ($d_{50}$) of 248 nm.

The emulsion had a solids content of 19.5%.

I.3 Preparation of the First Graft Layer 1GL (and of the Graft Copolymers Comprising Grafting Base and First Graft Layer)

The amounts, stated in Table I.1, of the sodium salt of a $C_{12}$- to $C_{18}$-paraffinsulfonic acid (Na salt), potassium peroxodisulfate (KPDS), sodium bicarbonate and sodium pyrophosphate (NaPP) were added to an emulsion of the grafting base GB, which, if required, was diluted with water. At 60° C., the monomer or the monomers and, if required, crosslinking agents were metered in over the stated time (addition time). Stirring was then carried out. The average particle diameters ($d_{50}$) of the resulting graft copolymers comprising HGB and 1GL were determined. The solids content of the emulsion of the resulting graft copolymers was measured; cf. Table I.1.

TABLE I.1

| | $1GL_1$ | $1GL_2$ | $1GL_3$ | $1GL_4$ | $1GL_5$ | $1GL_8$ | $1GL_9$ | $1GL_{10}$ |
|---|---|---|---|---|---|---|---|---|
| Preparation of the first graft layer | | | | | | | | |
| Emulsion GB | HGB1 | HGB2 | HGB3 | HGB4 | HGB4 | HGB7 | HGB8 | HGB9 |
| [g] | 4700 | 4700 | 4500 | 4500 | 4500 | 4700 | 4700 | 4300 |
| Water [g] | — | — | — | — | — | — | — | 2420 |
| Na salt [g] | 20 | 20 | 24 | 24 | 24 | 20 | 20 | 35 |
| KPDS [g] | 7.5 | 7.5 | 7.2 | 7.2 | 7.2 | 7.5 | 7.5 | 7.5 |
| NaHCO$_3$ [g] | 10 | 10 | 6 | 6 | 6 | 10 | 10 | 10 |
| NaPP [g] | 2 | 2 | 3 | 3 | 3 | 2 | 2 | 2 |
| Monomer(s) [g] | BA 2450 | BA 2450 | BA 2352 | BA 2352 | BA 2352 | BA 2450 | BA 2459 | BA 2445 |
| Cross-linking agent DCPA [g] | 50 | 50 | 48 | 48 | 48 | 50 | 50 | 50 |
| Addition time [h] | 3.5 | 3.5 | 3.5 | 3.5 | 3.5 | 3.5 | 3.5 | 3.5 |
| Stirring time [h] | 2 | 2 | 2 | 2 | 2 | 2 | 2 | 2 |
| Graft | OZ45942 | 95 | | | | | NAE566 | |

TABLE I.1-continued

Preparation of the first graft layer

|  | 1GL$_1$ | 1GL$_2$ | 1GL$_3$ | 1GL$_4$ | 1GL$_5$ | 1GL$_8$ | 1GL$_9$ | 1GL$_{10}$ |
|---|---|---|---|---|---|---|---|---|
| copolymer | HGCP1 HGB1 + 1GL$_1$ | HGCP2 HGB2 + 1GL$_2$ | HGCP3 HGB3 + 1GL$_3$ | HGCP4 HGB4 + 1GL$_4$ | HGCP5 HGB4 + 1GL$_5$ | HGCP8 HGB7 + 1GL$_8$ | HGCP9' HGB8 + 1GL$_9$ | HGCP10 HGB9 + 1GL$_{10}$ |
| d$_{50}$ [nm] SC* | 450 | 460 | 149 | 151 | 152 | 465 | 443 | 400 |
| A$^1$ or A$^2$ | 0.23 | 0.23 | 0.29 | 0.29 | 0.29 | 0.70 | 0.29 | 0.29 |
| Phase transition | Δ | Δ | Δ | Δ | Δ | ○ | Δ | ○ |

I.4 Preparation of the Second Graft Layer 2GL (and of the Graft Copolymers Comprising Grafting Base and First and Second Graft Layers)

The emulsion of a graft copolymer comprising HGB and 1GL was diluted with water and heated to 60° C. The amounts, stated in Table I.2, of the sodium salt of a C$_{12}$- to C$_{18}$-paraffinsulfonic acid (Na salt) and potassium peroxodisulfate (KPDS) were added. The monomer or the monomers was or were metered in over the stated time (addition time). Stirring was then carried out. The average particle diameters (d$_{50}$) of the resulting graft copolymers comprising HGB, 1GL and 2GL were determined. The solids content of the resulting graft copolymers was measured; cf. Table I.2.

TABLE I.2

Preparation of the second graft layer

|  | 2GL$_1$ | 2GL$_2$ | 3GL$_3$ | 2GL$_4$ | 2GL$_5$ | 2GL$_6$ | 2GL$_7$ |
|---|---|---|---|---|---|---|---|
| Emulsion | (OZ45942) | | | | | | |
| GCP | HGCP1 | HGCP1 | HGCP2 | HGCP2 | HGCP1 | HGCP2 | HGCP3 |
| [g] | 5000 | 5000 | 5000 | 5000 | 5100 | 5100 | 5000 |
| Water [g] | 2400 | 2400 | 2400 | 2400 | 1900 | 1900 | 1900 |
| Na salt [g] | 5 | 7 | 5 | 7 | 7 | 7 | — |
| KPDS [g] | 3.5 | 5 | 3.5 | 5 | 5 | 5 | 3.5 |
| Monomer(s) [g] | S 675 AN 225 | S 949 AN 316 | S 675 AN 225 | S 949 AN 316 | S 420 | S 420 | S 675 AN 225 |
| Addition time [h] | 2 | 2 | 2 | 2 | 1 | 1 | 2 |
| Stirring time [h] | 2 | 2 | 2 | 2 | 0.5 | 0.5 | 2 |
| Graft copolymer | HGCP9 HGB1 + 1GL$_1$ + 2GL$_1$ | HGCP10 HGB1 + 1GL$_1$ + 2GL$_2$ | HGCP11 HGB2 + 1GL$_2$ + 2GL$_3$ | HGCP12 HGB2 + 1GL$_2$ + 2GL$_4$ | HGCP13 HGB1 + 1GL$_1$ + 2GL$_5$ | HGCP14 HGB2 + 1GL$_2$ + 2GL$_6$ | HGCP15 HGB3 + 1GL$_3$ + 2GL$_7$ |
| d$_{50}$ [nm] | 540 | 539 | 520 | 531 | 495 | 480 | 168 |
| SC* | 38.8 | 34 | 34.2 | 36.9 | 33.3 | 33 | 37.9 |
| Phase transition | Δ | Δ | Δ | Δ | Δ | Δ | Δ |

|  | 2GL$_8$ | 2GL$_9$ | 2GL$_{10}$ | 2GL$_{11}$ | 2GL$_{12}$ | 2GL$_{14}$ | 2GL$_{15}$ | 2GL$_{16}$ |
|---|---|---|---|---|---|---|---|---|
| Emulsion GCP | | | | | | | (NAE 566/-95) | |
| [g] | HGCP3 4800 | HGCP4 5000 | HGCP4 5000 | HGCP4 5100 | HGCP5 4800 | HGCP8 5000 | HGCP9 5000 | 6800 |
| Water [g] | 1900 | 1900 | 1900 | 1900 | 1900 | 2400 | 2400 | 2100 |
| Na salt [g] | — | — | — | 6 | 6 | 5 | 5 | 10 |
| KPDS [g] | 5 | 3.5 | 5 | 5 | 5 | 3.5 | 3.5 | 4.2 |
| Monomer(s) [g] | S 960 AN 320 | S 675 AN 225 | S 960 AN 320 | S 420 | S 420 | S 675 AN 225 | S 675 AN 225 | S 792 AN 264 |
| Addition time [h] | 2 | 2 | 2 | 1 | 1 | 2 | 2 | 2 |
| Stirring time [h] | 2 | 2 | 2 | 0.5 | 0.5 | 2 | 2 | 2 |

TABLE I.2-continued

| | Preparation of the second graft layer | | | | | | | |
|---|---|---|---|---|---|---|---|---|
| Graft copolymer | HGCP16 HGB3 + 1GL$_3$ + 2GL$_8$ | HGCP17 HGB4 + 1GL$_4$ + 2GL$_9$ | HGCP18 HGB4 + 1GL$_4$ + 2GL$_{10}$ | HGCP19 HGB3 + 1GL$_3$ + 2GL$_{11}$ | HGCP20 HGB4 + 1GL$_5$ + 2GL$_{12}$ | HGCP22 HGB7 + 1GL$_8$ + 2GL$_{14}$ | HGCP27 HGB8 + 1GL$_9$ + 2GL$_{15}$ | HGCP28 HGB9 + 1GL$_{10}$ + 2GL$_{16}$ |
| d$_{50}$ [nm] | 175 | 169 | 159 | 159 | 162 | 550 | 525 | 450 |
| SC* | 41.1 | 38 | 34.3 | 34.4 | 34.4 | 38.7 | 36.7 | 35.0 |
| Phase transition | Δ | Δ | Δ | Δ | Δ | ○ | Δ | ○ |

I.5 Preparation of the Third Graft Layer 3GL (and of the Graft Copolymers Comprising Grafting Base and Both Graft Layers)

A mixture of 650 g of styrene and 220 g of acrylonitrile was metered into the mixture of the graft copolymer comprising HGB, 1GL and 2GL at 60° C. in the course of 2 hours while stirring. Stirring was then continued for 2 hours. The resulting graft copolymers, their average particle diameter and the solids contents of the emulsions obtained are shown in Table I.3.

TABLE I.3

| | Preparation of the third graft layer | | | |
|---|---|---|---|---|
| Graft copolymer Composition | HGCP23 HGCP13 + 3GL | HGCP24 HGCP14 + 3GL | HGCP25 HGCP19 + 3GL | HGCP26 HGCP20 + 3GL |
| d$_{50}$ (nm) | 540 | 535 | 180 | 185 |
| Solids content of the emulsion (%) | 36.2 | 30.9 | 41.4 | 41.3 |

I.6 Isolation of the Graft Copolymers

The graft copolymer emulsions obtained were precipitated by means of magnesium sulfate solution. The graft copolymer isolated was washed with distilled water and dried. The composition of the graft copolymers is shown in Table I.4.

TABLE I.4

| | Composition of the graft copolymers | | |
|---|---|---|---|
| HGCP | Composition, parts by weight (% by weight) | Size [nm] | Phase transitions |
| 9 (OZ45942) | 1 (95S/2DCPA/3BDA) 5 (98BA/2DCPA) 0.43 (75S + 25AN | 540 | Δ |
| 10 | 1 (95S/2DCPA/3BDA) 5 (98BA/2DCPA) 0.61 (75S + 25AN) | 539 | Δ |
| 22 | 1 (95S/2DCPA/3BDA) 5 (98BA/2DCPA) 0.43 (75S + 25AN) | 550 | ○ |
| 23 | 1 (95S/2DCPA/3BDA) 5 (98BA/2DCPA) 0.61 (35S + 65SAN (75S +5AN)) | 540 | Δ |
| 11 | 1 (98S/2DCPA) 5 (98BA/2DCPA) 0.43 (75S + 25AN) | 520 | Δ |
| 12 | 1 (98S/2DCPA) 5 (98BA/2DCPA) 0.61 (75S + 25AN) | 531 | Δ |
| 15 | 1 (95S/2DCPA/3BDA) 4 (98BA/2DCPA) 0.43 (75S + 25AN) | 168 | Δ |
| 16 | 1 (95S/2DCPA/3BDA) 4 (98BA/2DCPA) 0.61 (75S + 25AN) | 175 | Δ |
| 17 | 1 (98S/2DCPA) 4 (98BA/2DCPA) 0.43 (75S + 25AN) | 169 | Δ |
| 18 | 1 (98S/2DCPA) 4 (98BA/2DCPA) 0.61 (75S + 25AN) | 176 | Δ |
| 24 | 1 (98S/2DCPA) 5 (98BA/2DCPA) 0.61 (35S + 65SAN (75S + 25AN)) | 535 | Δ |
| 25 | 1 (95S/2DCPA/3BDA) 4 (98BA/2DCPA) 0.61 (35S + 65SAN (75S + 25AN)) | 180 | Δ |
| 26 | 1 (98S/2DCPA) 4 (98BA/2DCPA) 0.61 (35S + 65SAN (75S + 25AN)) | 185 | Δ |
| 7 | 1 (98BA/2DCPA) 0.61 (75S + 25AN) | 110 | Δ |
| 27 (NAE566/95) | 1 (96.5S/2DCPA) 1.5 DVB 5 (98BA/2DCPA) 0.43 (75S + 25AN) | 535 | Δ |
| 28 | 1 (46.5S/2DCPA) 1.5 DVB 3 (98BA/2DCPA) 0.45 (75S + 25AN) | 450 | |

The data within the brackets indicate the composition of the grafting bases HGB or of the graft layers 1GL and 2GL in percent by weight. The number in front of the bracket indicates the parts by weight of the grafting base or of the respective graft layer.

I.7 Preparation of the Thermoplastic Materials from a Graft Copolymer i or ii and the Copolymer iii A styrene/acrylonitrile copolymer having an acrylonitrile content of 35% and a viscosity number of 80 ml/g was used as the hard component for the preparation of the blend. The precipitated and dried novel graft copolymer or a mixture of the novel graft copolymer with further graft copolymers was mixed in an extruder at 260° C. with the hard component so that the resulting molding materials had a graft copolymer content of 50%. Shaped articles were produced from this molding material by injection molding. The results from the testing of the performance characteristics are shown in Tables I.5 and I.6.

TABLE I.5

Blends of the graft rubbers (component i or ii) with a styrene/acrylonitrile copolymer (component III); in each case 50% by weight of component i or ii were mixed with 50% by weight of component iii in an extruder

| Example No. | Graft copolymer | $a_k$ (220/23)[1] (kJ/m²) | $a_k$ (280/23) (kJ/m²) | $a_k$ (220/0) (kJ/m²) | $a_k$ (280/0) (kJ/m²) | $a_n$ (220/−30) (kJ/m²) | $a_n$ (280/−30) (kJ/m²) |
|---|---|---|---|---|---|---|---|
| Individual GCP | | | | | | | |
| (OZ45942) 1 | GCP 9 | 42 | 46 | 28 | 27 | 250 | 234 |
| 2 | GCP 10 | 32 | 33 | 23 | 24 | 195 | 215 |
| 3 | GCP 22 | 52 | 54 | 33 | 34 | 270 | 285 |
| 4 | GCP 23 | 29 | 31 | 18 | 20 | 198 | 207 |
| 5 | GCP 7 | 9 | 25 | 4 | 8 | 18 | 38 |
| 6 | GCP 11 | 26 | 28 | 12 | 12 | 120 | 131 |
| 7 | GCP 12 | 20 | 21 | 10 | 9 | 100 | 110 |
| 8 | GCP 15 | 12 | 15 | 4 | 7 | 21 | 24 |
| 9 | GCP 16 | 4 | 5 | 1 | 1 | 10 | 12 |
| 10 | GCP 17 | 19 | 30 | 7 | 10 | 48 | 81 |
| 11 | GCP 18 | 10 | 21 | 6 | 8 | 35 | 42 |
| 12 | GCP 24 | 21 | 22 | 10 | 11 | 110 | 95 |
| 13 | GCP 25 | 29 | 28 | 6 | 8 | 35 | 42 |
| 14 | GCP 26 | 30 | 31 | 8 | 10 | 75 | 82 |
| (NAE566/95) 15 | GCP 27 | 57 | 61 | 32 | 38 | 240 | 251 |
| 16[2] | GCP 28 | 41 | 37 | 17 | 16 | 220 | 210 |

[1](Processing/test temperature)
[2]58% by weight of component i or ii mixed with 42% by weight of component iii

TABLE I.6

Blends of two different graft copolymers (components i and ii or two different components II); in each case 15% by weight of component i and 35% by weight of component ii were mixed with 50% by weight of the styrene/acrylonitrile copolymer (component iii) in an extruder

| Example No. | HGCP No. 15/35% by weight | $a_k$ (220/23) (kJ/m²) | $a_k$ (280/23) (kJ/m²) | $a_k$ (220/0) (kJ/m²) | $a_k$ (220/0) (kJ/m²) | $a_n$ (220/−30) (kJ/m²) | $a_n$ (220/−30) (kJ/m²) |
|---|---|---|---|---|---|---|---|
| GCP blends | | | | | | | |
| 16 | 9/7 | 41 | 40 | 25 | 27 | 250 | 263 |
| 17 | 9/15 | 44 | 41 | 25 | 27 | 255 | 268 |
| 18 | 9/17 | 45 | 44 | 28 | 28 | 280 | 294 |
| 19 | 10/7 | 37 | 36 | 22 | 23 | 207 | 187 |
| 20 | 10/16 | 31 | 28 | 18 | 16 | 167 | 187 |
| 21 | 22/7 | 46 | 45 | 29 | 30 | 250 | 264 |
| 22 | 22/15 | 46 | 44 | 32 | 29 | 280 | 275 |
| 23 | 22/17 | 52 | 50 | 33 | 33 | 285 | 278 |
| 24 | 23/7 | 31 | 31 | 22 | 21 | 189 | 200 |
| 25 | 23/25 | 33 | 35 | 21 | 22 | 200 | 209 |
| 26 | 11/7 | 29 | 30 | 12 | 12 | 152 | 145 |
| 27 | 11/17 | 34 | 33 | 19 | 20 | 190 | 185 |
| 28 | 12/7 | 25 | 26 | 13 | 11 | 135 | 119 |
| 29 | 12/18 | 31 | 30 | 19 | 21 | 181 | 190 |
| 30 | 15/7 | 11 | 20 | 4 | 7 | 25 | 42 |
| 31 | 24/7 | 24 | 22 | 12 | 10 | 90 | 85 |
| 32 | 24/26 | 35 | 40 | 23 | 26 | 215 | 231 |
| 33 | 26/7 | 19 | 27 | 7 | 10 | 89 | 97 |
| 34 | 28/7 | 40 | 41 | 24 | 20 | 200 | 205 |
| 35 | 28/26 | 38 | 38 | 20 | 18 | 190 | 185 |

| Example No. | ΔE | Gloss | Vicat [° C.] | MVI [g/10 min] |
|---|---|---|---|---|
| GCP blends | | | | |
| 16 | 5.7 | 82 | 95 | 3 |
| 17 | 6.4 | 82 | 95 | 3 |
| 18 | 6.7 | 82 | 94 | 3 |
| 19 | 6.1 | 82 | 95 | 3 |
| 20 | 6.6 | 82 | 95 | 3 |
| 21 | 6.0 | 82 | 94 | 3 |
| 22 | 6.6 | 82 | 95 | 3 |
| 23 | 6.9 | 83 | 95 | 3 |
| 24 | 6.3 | 83 | 95 | 3 |

TABLE I.6-continued

Blends of two different graft copolymers (components i and ii or two different components II); in each case 15% by weight of component i and 35% by weight of component ii were mixed with 50% by weight of the styrene/acrylonitrile copolymer (component iii) in an extruder

| 25 | 6.8 | 82 | 95 | 3 |
| 26 | 4.3 | 81 | 94 | 3 |
| 27 | 5.2 | 81 | 95 | 3 |
| 28 | 4.8 | 82 | 95 | 3 |
| 29 | 5.4 | 81 | 95 | 3 |
| 30 | 5.9 | 82 | 94 | 3 |
| 31 | 4.5 | 82 | 95 | 3 |
| 32 | 6.2 | 82 | 94 | 3 |
| 33 | 6.5 | 82 | 94 | 3 |
| 34 | 7.9 | 85 | 95 | 3 |
| 35 | 8.4 | 88 | 94 | 3 |

II. Preparation of Graft Copolymers and Molding Materials having a Soft Core

II.1 Preparation of a Polybutyl Acrylate Grafting Base (GB) (OZ 46678, NAE 567/95)

4500 g of water, 30 g of the sodium salt of a $C_{12}$- to $C_{18}$-paraffinsulfonic acid, 9 g of potassium peroxodisulfate, 12 g of sodium bicarbonate and 1 g of sodium pyrophosphate were heated to 70° C. while stirring and under nitrogen. A mixture of 2940 g of n-butyl acrylate and 40 g of dihydrodicyclopentadienyl acrylate (DCPA) were added in the course of 3 hours. After the end of the monomer addition, the emulsion was kept at 60° C. for a further hour. The PBA core thus obtained had an average particle diameter ($d_{50}$) of 80 nm. The solids content of the PBA core was 39.9%.

II.2 Preparation of the First Graft Layer

II.2.1 First Graft Layer ($1GL_1$)

(OZ 46678)

4200 g of water, 3 g of the sodium salt of a $C_{12}$- to $C_{18}$-paraffinsulfonic acid, 1.75 g of potassium peroxodisulfate, 2.5 g of sodium bicarbonate, 1 g of sodium pyrophosphate and 40 g of the grafting base latex were heated to 65° C. A mixture of 475 g of styrene, 10 g of DCPA and 15 g of BDA was then added in the course of 3 hours. After the end of the monomer addition, the emulsion was kept at 65° C. for a further hour.

The first graft layer ($1GL_1$) together with the core GB had an average particle diameter ($d_{50}$) of 250 nm. The emulsion had a solids content of 10.5%.

II.2.2 First Graft Layer ($1GL_2$)

(OZ 46678) The first graft layer (1GL2) was prepared similarly to $1GL_1$, except that 490 g of styrene were added and no BDA and no crosslinking agent were present.

The first graft layer ($1GL_2$) together with the core GB had an average particle diameter ($d_{50}$) of 263 nm. The emulsion had a solids content of 10.7%.

II.2.3 Grafting Base (GB')

(OZ 46678)

4200 g of water, 6 g of the sodium salt of a $C_{12}$- to $C_{18}$-paraffinsulfonic acid, 2 g of potassium peroxodisulfate, 3 g of sodium bicarbonate and 1.5 g of sodium pyrophosphate were heated to 65° C. A mixture of 570 g of styrene, 12 g of DCPA and 18 g of BDA was then added in the course of 3 hours. After the end of the monomer addition, the emulsion was kept at 65° C. for a further hour.

The grafting base (GB') had an average particle diameter ($d_{50}$) of 82 nm. The emulsion had a solids content of 12.7%.

II.2.4 Grafting Base (GB")

(OZ 46678)

The grafting base (GB") was prepared similarly to GB', except that 588 g of styrene were added and no BDA was present.

The grafting base (GB") had an average particle diameter ($d_{50}$) of 85 nm. The emulsion had a solids content of 12.6%.

II.2.5 First Graft Layer ($1GL_5$)

(OZ 46678)

4400 g of water, 40 g of finely divided PBA latex (GB) (40% strength by weight in water) having a $d_{50}$ of 80 nm, as seed latex, 9.2 g of potassium peroxodisulfate, 9 g of sodium bicarbonate and 4.5 g of sodium pyrophosphate were heated to 65° C. while stirring. A mixture of 2940 g of n-butyl acrylate and 60 g of DCPA and a solution of 18 g of the sodium salt of a $C_{12}$- to $C_{18}$-paraffinsulfonic acid were added separately in the course of 3 hours and stirring was continued for a further 2 hours at 65° C.

The first graft layer ($1GL_5$) together with the core GB had an average particle diameter ($d_{50}$) of 450 nm. The emulsion had a solids content of 39.8%.

II.2.6 Grafting base (GB''')

(OZ 46678)

4200 g of water, 30 g of the sodium salt of a $C_{12}$- to $C_{18}$-paraffinsulfonic acid, 9.2 g of potassium peroxodisulfate, 9 g of sodium bicarbonate and 4.5 g of sodium pyrophosphate were heated to 65° C. while stirring. A mixture of 2940 g of n-butyl acrylate and 60 g of DCPA were added in the course of 3 hours.

The grafting base (GB''') had an average particle diameter ($d_{50}$) of 80 nm. The emulsion had a solids content of 42.1%.

II.2.7 Grafting Base (GB'''')

(NAE 567/95)

4500 g of water, 30 g of the sodium salt of a $C_{12}$- to $C_{18}$-paraffinsulfonic acid, 9 g of potassium peroxodisulfate, 12 g of sodium bicarbonate and 1 g of sodium pyrophosphate were heated to 65° C. while stirring and under nitrogen. A mixture of 2940 g of styrene and 60 g of DCPA was added in the course of 3 hours. After the end of the monomer addition, the emulsion was kept at 65° C. for a further hour.

The grafting base (GB'''') had an average particle diameter ($d_{50}$) of 80 nm. The emulsion had a solids content of 39.9%.

II.2.8 First Graft Layer ($1GL_7$)

(OZ 46678)

The first graft layer (1GL7) was prepared similarly to $1GL_1$, except that the mixture of styrene, DCPA and BDA was added in the course of 1 hour. After the end of the reaction, stirring was continued for a further hour at 65° C.

The first graft layer (1GL7) had an average particle diameter ($d_{50}$) of 245 nm. The emulsion had a solids content of 8.9%.

II.2.9 First Graft Layer ($1GL_8$)

(NAE 567/95)

4200 g of water, 3 g of the sodium salt of a $C_{12}$- to $C_{18}$-paraffinsulfonic acid, 1.75 g of potassium peroxodisulfate, 2.5 g of sodium bicarbonate, 1 g of sodium pyrophosphate and 40 g of the grafting base latex were heated to 65° C. A mixture of 4825 g of styrene, 10 g of DCPA and 7.5 g of DVB was then added in the course of 1 hour. After the end of the monomer addition, the emulsion was kept at 65° C. for a further hour.

The first graft layer (1GL$_8$) had an average particle diameter (d$_{50}$) of 210 nm. The emulsion had a solids content of 6.9%.

II .3 Preparation of the Second Graft Layer (2GL)

The amounts, stated in Table 2.1, of the sodium salt of a C$_{12}$- to C$_{18}$-paraffinsulfonic acid (Na salt), potassium peroxodisulfate (KPDS), sodium bicarbonate and sodium pyrophosphate (NaPP) were added to an emulsion of a first graft layer (1GL) or of the grafting bases GB', GB", GB'" and GB"", which, if required, was diluted with water. At 60° C., the monomer or the monomers and, if required, crosslinking agents were metered in over the stated time (addition time). Stirring was then carried out. The average particle diameters (d$_{50}$) of the resulting graft copolymers comprising GB (GB', GB"), 1GL and 2G1 were determined. The solids content of the emulsion of the resulting graft copolymers was measured; cf. Table II.1.

TABLE II.1

Preparation of the second graft layer (2GL)

| | 2GL$_1$ | 2GL$_2$ | 2Gl$_3$ | 2GL$_4$ | 2Gl$_5$ | 2GL$_6$ | 2GL$_7$ | 2GL$_8$ | 2GL$_9$ | 2GL$_{10}$ |
|---|---|---|---|---|---|---|---|---|---|---|
| Emulsion 1P | 1G$_1$ | 1Gl$_2$ | GB' | GB" | GB" | 1GL$_5$ | GB'" | 1GL$_7$ | 1GL$_8$ | HGB$_9$ |
| A [g] | 4700 | 4700 | 4500 | 4500 | 4500 | 4800 | 4800 | 4700 | 4700 | 4700 |
| Water [g] | — | — | — | — | — | 1900 | 1900 | — | — | — |
| Na salt [g] | 20 | 20 | 24 | 24 | 24 | 5 | — | 20 | 20 | 20 |
| KPDS [g] | 7.5 | 7.5 | 7.2 | 7.2 | 7.2 | 4.5 | 5 | 7.5 | 7.5 | 7.5 |
| Na$_2$—CO$_3$ [g] | 10 | 10 | 6 | 6 | 6 | — | — | 10 | 10 | 10 |
| NaPP [g] | 2 | 2 | 3 | 3 | 3 | — | — | 2 | 2 | 2 |
| Monomer(s) [g] | BA 2450 | BA 2450 | BA 2352 | BA 2352 | BA 2352 | S 395 | S 915 An 305 | BA 2450 | BA 2459 | BA 2459 |
| Crosslinking agent DCPA [g] | 50 | 50 | 48 | 48 | 48 | — | — | 50 | 50 | 50 |
| Addition time [h] | 3.5 | 3.5 | 3.5 | 3.5 | 3.5 | 1 | 2 | 3.5 | 3.5 | 3.5 |
| Stirring time [h] | 2 | 2 | 2 | 2 | 2 | 0.5 | 0.1 | 2 | 2 | 2 |
| Product Graft copolymer | SGCP1: GB + 1GL$_1$ + 2GL$_1$ | SGCP2: GB + 1GL$_2$ + 2GL$_2$ | SGCP3: GB' + 2GL$_3$ | SGCP4: GB" + 2GL$_4$ | SGCP5: GB" + 2GL$_5$ | SGCP6: GB + 1GL$_5$ + 2GL$_6$ | SGCP7: GB'" + 2GL$_7$ | SGCP8: GB + 1GL$_7$ + 2GL$_8$ | SGCP27: GB"" | SGCP9: GB + 1GL$_8$ + 2GL$_{10}$ |
| d$_{50}$ [nm] | 455 | 460 | 149 | 151 | 152 | 475 | 100 | 463 | 443 | 440 |
| SC* | 38.5 | 39.9 | 42.1 | 42.0 | 42.2 | 32.4 | 40.5 | 38.0 | 36.5 | 36.5 |
| Z$^1$ or Z$^2$ | 0.32 | 0.23 | 0.29 | 0.29 | 0.29 | — | — | 0.70 | 0.70 | 0.70 |
| Phase transition | Δ | Δ | Δ | Δ | Δ | Δ | Δ | ○ | ○ | ○ |

II.4 Preparation of the Third Graft Layer (3GL)

The emulsion of a graft copolymer comprising GB (if required, GB'or GB"), 1GL and 2GL was diluted with water and heated to 60° C. The amounts, stated in Table II.2, of the sodium salt of a C$_{12}$- to C$_{18}$-paraffinsulfonic acid and potassium peroxodisulfate were added. The monomer or the monomers was or were metered in over the stated time. Stirring was then carried out. The average particle diameters (d$_{50}$) of the resulting graft copolymers comprising GB (if required, GB' or GB"), 1GL, 2GL and 3GL were determined. The solids content of the resulting graft copolymers was measured; cf. Table II.2.

TABLE II.2

Preparation of the third graft layer (3GL)

| (OZ 46678) | $3G_1$ | $3GL_2$ | $3GL_3$ | $3GL_4$ | $3GL_5$ | $3GL_6$ | $3GL_7$ | $3GL_8$ |
|---|---|---|---|---|---|---|---|---|
| Emulsion | SGCP1 | SGCP1 | SGCP2 | SGCP2 | SGCP1 | SGCP2 | HGCP3 | HGCP3 |
| GCP [g] | 5000 | 5000 | 5000 | 5000 | 5100 | 5100 | 5000 | 4800 |
| Water [g] | 2400 | 2400 | 2400 | 2400 | 1900 | 1900 | 1900 | 1900 |
| Na salt [g] | 5 | 7 | 5 | 7 | 7 | 7 | — | — |
| KPDS [g] | 3.5 | 5 | 3.5 | 5 | 5 | 5 | 3.5 | 5 |
| Monomer(s) [g] | S 675 AN 225 | S 949 AN 316 | S 675 AN 225 | S 949 AN 316 | S 420 | S 420 | S 675 AN 225 | S 960 AN 320 |
| Addition time [h] | 2 | 2 | 2 | 2 | 1 | 1 | 2 | 2 |
| Stirring time [h] | 2 | 2 | 2 | 2 | 0.5 | 0.5 | 2 | 2 |
| Graft copolymer | SGCP9 GB + $1GL_1$ + $2GL_2$ + $3GL_3$ | SGCP10 GB + $1GL_1$, + $2GL_1$ + $3GL_2$ | SGCP11 GB + $1GL_2$ + $2GL_2$ + $3GL_3$ | SGCP12 GB + $1GL_2$ + $2GL_2$ + $3GL_4$ | SGCP13 GB + $1GL_1$ + $2GL_1$ + $3GL_5$ | SGCP14 GB + $1GL_2$+ $2GL_2$ + $3GL_6$ | HGCP15 GB' + $2GL_3$ + $2GL_7$ + | HGCP16 GB' + $2GL_3$ + $3GL_8$ |
| $d_{50}$ [nm] | 560 | 540 | 520 | 535 | 489 | 480 | 165 | 178 |
| SC* | 38.9 | 34.3 | 34.2 | 36.9 | 33.4 | 33 | 37.9 | 41.1 |
| Phase transition |  | Δ | Δ | Δ | Δ | Δ | Δ | Δ |

| | $3GL_9$ | $3GL_{10}$ | $3GL_{11}$ | $3GL_{12}$ | $3GL_{13}$ | $3GL_{14}$ | $3GL_{15}$ |
|---|---|---|---|---|---|---|---|
| Emulsion GCP [g] | HGCP4 5000 | HGCP4 5000 | HGCP4 5100 | HGCP5 4800 | SGCP6 4800 | SGCP8 5000 | SGCP9 5000 |
| Water [g] | 1900 | 1900 | 1900 | 1900 | 1900 | 2400 | 2400 |
| Na salt [g] | — | — | 6 | 6 | — | 5 | 5 |
| KPDS [g] | 3.5 | 5 | 5 | 5 | 3.5 | | 3.5 |
| Monomer(s) [g] | S 675 AN 225 | S 960 AN 320 | S 420 | S 420 | S 550 AN 185 | S 675 AN 225 | S 675 AN 225 |
| Addition time [h] | 2 | 2 | 1 | 1 | 2 | 2 | 2 |
| Graft copolymer | HGCP17 GB" + $2GL_4$ + $3GL_9$ | HGCP18 GB" + $2GL_4$ + $3GL_{10}$ | HGCP19 GB' + $2GL_3$ + $3GL_{11}$ | HGCP20 GB" + $2GL_5$ + $3GL_{12}$ | SGCP21 GB + $1GL_5$ + $2GL_6$ + $3GL_{13}$ | SGCP22 GB + $1GL_7$ + $2G_8$ + $3GL_{14}$ | SGCP27 GB + $1GL_8$ + $2GL_{10}$ + $3GL_{15}$ |
| $d_{50}$ [nm] | 166 | 177 | 159 | 162 | 508 | 535 | 535 |
| SC* | 38 | 40.5 | 34.3 | 34.4 | 38.5 | 38.7 | 38.7 |
| Phase transition | Δ | Δ | Δ | Δ | Δ | ○ | ○ |

II.5 Preparation of a Further Graft Layer (4GL) (OZ 46678)

A mixture of 650 g of styrene and 220 g of acrylonitrile was metered in each case into the emulsion of the grafting base (GB, GB', GB"), the first graft layer (1GL), the second graft layer (2GL) and the third graft layer (3GL) at 60° C. in the course of 2 hours while stirring. Stirring was then continued for a further 2 hours.

Table II.3 below shows the graft copolymers obtained in this manner and comprising the grafting bases (GB, GB') [SGCP19] and (GB") [HGCP20] and the graft layers 1GL, 2GL, 3GL and 4GL. Both for the novel graft copolymer SGCP23 and the further graft copolymers SGCP24, HGCP25 and HGCP26, their average particle diameters and the solids content of the resulting emulsion are shown in each case.

TABLE II.3

| Graft copolymer Composition | SGCP 23 SGCP 13 + 4 GL | SGCP 24 SGCP 14 + 4 GL | HGCP 25 HGCP 19 + 4 GL | HGCP 26 HGCP 20 + 4 GL |
|---|---|---|---|---|
| $d_{50}$ [nm] | 545 | 532 | 183 | 180 |
| Solids content of the emulsion [%] | 36.5 | 30.9 | 41.4 | 41.3 |
| Phase transition | Δ | Δ | Δ | Δ |

II.6 Isolation of the Graft Copolymers

The graft copolymer emulsions obtained were isolated as described under I.6.

The composition of some graft copolymers is shown in Table II.4.

TABLE II.4

Composition of the graft copolymers

| GCP | Composition, parts by weight (% by weight) | Size [nm] | Phase transition |
|---|---|---|---|
| (OZ46678) | | | |
| S9 | 1 (95S/2DCPA/3BDA) 5 (98BA/2DCPA) 0.43 (75S + 25AN) | 560 | Δ |
| S10 | 1 (95S/2DCPA/3BDA) 5 (98BA/2DCPA) 0.61 (75S + 25AN) | 540 | Δ |
| S22 | 1 (95S/2DCPA/3BDA) 5 (98BA/2DCPA) 0.43 (75S + 25AN) | 535 | ○ |
| S23 | 1 (95S/2DCPA/3BDA) 5 (98BA/2DCPA) 0.61 (35S + 65SAN (75S + 25AN) | 545 | Δ |
| S11 | 1 (98S/2DCPA) 5 (98BA/2DCPA) 0.43 (75S + 25AN) | 520 | Δ |
| S12 | 1 (98S/2DCPA) 5 (98BA/2DCPA) 0.61 (75S + 25AN) | 535 | Δ |
| H15 | 1 (95S/2DCPA/3BDA) 4 (98BA/2DCPA) 0.43 (75S + 25AN) | 165 | Δ |
| H16 | 1 (95S/2DCPA/3BDA) 4 (98BA/2DCPA) 0.61 (75S + 25AN) | 178 | Δ |
| H17 | 1 (98S/2DCPA) 4 (98BA/2DCPA) 0.43 (75S + 25AN) | 166 | Δ |
| H18 | 1 (98S/2DCPA) 4 (98BA/2DCPA) 0.61 (75S + 25AN) | 177 | Δ |
| S24 | 1 (98S/2DCPA) 5 (98BA/2DCPA) 0.61 (35S + 65SAN (75S + 25AN) | 532 | Δ |
| H25 | 1 (95S/2DCPA/3BDA) 4 (98BA/2DCPA) 0.61 (35S + 65SAN (75S + 25AN) | 183 | |
| H26 | 1 (98S/2DCPA) 4 (98BA/2DCPA) 0.61 (35S + 65SAN (75S + 25AN) | 180 | |
| S21 | 1 (98S/2DCPA) 0.61 (35S + 65SAN) (75S + 25AN) | 508 | |
| S7 | 1 (95BA/2DCPA) 0.61 (75S + 25AN) | 110 | |
| S27 | 1 (96.5S/2DCPA/1.5 DVB) 5 (98BA/2DCPA) 0.43 (75S + 25AN) | 535 | ○ |

The data in the brackets shows the composition of the graft layers 1GL, 2GL and 3GL in percent by weight. The number in front of the bracket indicates the parts by weight of the grafting base or of the respective graft layer. The grafting base GB was used for the preparation of the graft layer $1GL_1$, $1GL_2$, $1GL_5$ and $1GL_7$. The grafting bases GB', GB", GB'" and GB"" were prepared without the use of GB. The ratios between the graft layers $1GL_{1,2, \ldots}$ and the grafting base GB are shown in the Examples.

II.7 Preparation of the Thermoplastic Materials from a Graft Copolymer i or ii and a Copolymer iii The preparation of the blends corresponds to that described under I.7. The results from the testing of the performance characteristics are shown in Tables II.5 and II.6.

TABLE II.5

Blends of the graft rubbers (component i or ii) with a styrene/acrylonitrile copolymer (component iii); in each case 50% by weight of component i or ii were mixed with 50% by weight of component iii in an extruder

| Example No. | Graft copolymer GCP | Wg (220/0) [Nm] | Wg (280/0) [Nm] | $a_k$ (220/0) (kJ/m$^2$) | $a_k$ (280/0) (kJ/m$^2$) | $a_n$ (220/-30) (kJ/m$^2$) | $a_n$ (280/-30) (kJ/m$^2$) |
|---|---|---|---|---|---|---|---|
| 1 | SGCP 9 | 33 | 32 | 31 | 32 | 270 | 248 |
| 2 | SGCP 10 | 31 | 30 | 25 | 29 | 218 | 230 |
| 3 | SGCP 22 | 35 | 33 | 38 | 36 | 280 | 285 |
| 4 | SGCP 23 | 30 | 31 | 21 | 20 | 207 | 201 |
| 5 | SGCP 7 = GCP 7 | 23 | 33 | 4 | 8 | 18 | 38 |
| 6 | SGCP 11 | 18 | 19 | 12 | 12 | 120 | 131 |
| 7 | SGCP 12 | 16 | 14 | 10 | 9 | 100 | 110 |
| 8 | GCP 15 | 20 | 32 | 4 | 7 | 21 | 24 |
| 9 | GCP 16 | 19 | 30 | 1 | 1 | 10 | 12 |
| 10 | GCP 17 | 19 | 30 | 7 | 10 | 48 | 81 |
| 11 | GCP 18 | 25 | 32 | 6 | 8 | 35 | 42 |
| 12 | SGCP 21 | 17 | 17 | 14 | 14 | 240 | 230 |
| 13 | SGCP 24 | 18 | 15 | 10 | 11 | 110 | 95 |
| 14 | SGCP 25 | 23 | 31 | 6 | 8 | 35 | 42 |
| 15 | GCP 26 | 25 | 34 | 8 | 10 | 75 | 82 |

TABLE II.6

Blends of two different graft copolymers (component i and ii or two different components ii); in each case 15% by weight of component i and 35% by weight of component ii were mixed with 50% by weight of the styrene/acrylonitrile copolymer (component iii) in an extruder.

| Example No. | GCP No. 15/30% by weight | Wg (220/0) [N/m] | Wg (280/0) [N/m] | $a_k$ (280/0) (kJ/m$^2$) | $a_k$ (280/0) (kJ/m$^2$) | $a_n$ (220/-30) (kJ/m$^2$) | $a_n$ (280/-30) (kJ/m$^2$) |
|---|---|---|---|---|---|---|---|
| (OZ 46678) | | | | | | | |
| 16 | 9/7 | 34 | 33 | 28 | 29 | 260 | 253 |
| 17 | 9/15 | 34 | 34 | 28 | 30 | 270 | 261 |
| 18 | 9/17 | 35 | 33 | 30 | 32 | 280 | 275 |
| 19 | 10/7 | 30 | 29 | 23 | 23 | 220 | 198 |
| 20 | 10/16 | 31 | 30 | 23 | 24 | 200 | 205 |
| 21 | 22/7 | 37 | 35 | 34 | 33 | 284 | 280 |
| 22 | 22/15 | 34 | 31 | 31 | 29 | 280 | 275 |
| 23 | 22/17 | 36 | 35 | 33 | 33 | 285 | 280 |
| 24 | 23/7 | 31 | 30 | 22 | 21 | 185 | 193 |
| 25 | 23/25 | 31 | 33 | 21 | 22 | 210 | 205 |
| 26 | 11/7 | 26 | 25 | 12 | 12 | 152 | 145 |
| 27 | 11/17 | 28 | 27 | 19 | 20 | 190 | 185 |
| 28 | 12/7 | 24 | 24 | 13 | 11 | 135 | 119 |
| 29 | 12/18 | 24 | 23 | 19 | 21 | 181 | 190 |
| 30 | 15/7 | 14 | 18 | 4 | 7 | 25 | 42 |
| 31 | 24/7 | 27 | 26 | 12 | 10 | 90 | 85 |
| 32 | 24/26 | 28 | 29 | 23 | 26 | 215 | 231 |
| 33 | 26/7 | 19 | 27 | 7 | 10 | 89 | 97 |
| (NAE567/95) 34 | 100 SGCP27* | — | — | 32 | 40 | — | — |

| Example No. | ΔE | Gloss | Vicat [° C.] | MVI [g/10 min] |
|---|---|---|---|---|
| (OZ46678) | | | | |
| 16 | 5.6 | 81 | 94 | 3 |
| 17 | 6.6 | 82 | 95 | 3 |
| 18 | 6.6 | 82 | 94 | 3 |
| 19 | 5.9 | 82 | 95 | 3 |
| 20 | 6.5 | 82 | 95 | 3 |
| 21 | 6.0 | 82 | 93 | 3 |
| 22 | 6.7 | 82 | 95 | 3 |
| 23 | 6.5 | 83 | 95 | 3 |
| 24 | 6.4 | 83 | 94 | 3 |
| 25 | 6.8 | 82 | 95 | 3 |
| 26 | 4.3 | 81 | 94 | 3 |
| 27 | 5.2 | 81 | 95 | 3 |
| 28 | 4.8 | 82 | 95 | 3 |
| 29 | 5.4 | 81 | 95 | 3 |
| 30 | 5.9 | 82 | 94 | 3 |
| 31 | 4.5 | 82 | 95 | 3 |
| 32 | 6.2 | 82 | 94 | 3 |
| 33 | 6.5 | 82 | 94 | 3 |
| (NAE567/95) 34 | 4.2 | 80 | | |

III. Graft Copolymer Blends
III1.1 Graft Copolymer Blend M1
(NAE 525/95)
III.1.1 Preparation of the Graft Copolymer MI.1
III1.1.1 Preparation of the grafting base MI.1.1

The monomer mixture comprising 3.2 g of DCPA and 156.8 g of n-butyl acrylate in 1500 g of water was heated to 65° C. while stirring, with the addition of 10 g of the potassium salt of a $C_{12}$- to $C_{18}$-paraffinsulfonic acid, 3 g of potassium peroxodisulfate, 3 g of sodium bicarbonate and 1.5 g of sodium pyrophosphate. 10 minutes after initiation of the polymerization reaction, a mixture of a further 16.8 g of DCPA and 823.2 g of n-butyl acrylate was metered in over 3 hours. After the end of the monomer addition, the emulsion was kept at 65° C. for a further hour.

III.1.1.2 Preparation of the Graft Layers MI.1.2 and MI.1.3

2100 g of the emulsion prepared by the above method and containing grafting base MI.1.1 were mixed with 1150 g of water and 2.7 g of potassium peroxodisulfate and heated to 65° C. while stirring. After the reaction temperature had been reached, 165 g of styrene were metered in over 1 hour (graft layer MI.1.2). After the end of the addition, a mixture of 372 g of styrene and 124 g of acrylonitrile was metered in. After the end of the addition, the emulsion was kept at 65° C. for a further 2 hours (graft layer MI.1.3). The average particle size ($d_{50}$) of the graft copolymers was 102 nm. The graft copolymer was precipitated from the emulsion by means of calcium chloride solution at 95° C., washed with water and dried in a warm air stream.

III.1.2 Preparation of the Graft Copolymer MI.2
III.1.2.1 Preparation of the grafting base MI.2.1

The preparation of the grafting base MI.2.1 corresponds to the preparation, described above, of the grafting base MI.1.1.

III.1.2.2 Preparation of the grafting base MI.2.2

4200 g of water, 3 g of the sodium salt of a $C_{12}$- to $C_{18}$-paraffinsulfonic acid, 1.75 g of potassium peroxodisulfate, 2.5 g of sodium bicarbonate, 1 g of sodium pyrophosphate and 40 g of the grafting base MI.2.1 were first heated to 65° C. Thereafter, a mixture of 475 g of styrene, 10 g of DCPA and 15 g of BDA was added in the course of 1 hour. After the end of the monomer addition, the emulsion was kept at 65° C. for a further hour.

The average particle diameter ($d_{50}$) of the first graft layer MI.2.2 and the grafting base MI.2.1 together was 238 nm.

The emulsion had a solids content of 6.8%.

III.1.2.3 Preparation of the Second Graft Layer MI.2.3

20 g of the sodium salt of a $C_{12}$- to $C_{18}$-paraffinsulfonic acid, 7.5 g of potassium peroxodisulfate, 10 g of sodium bicarbonate and 2 g of sodium pyrophosphate were added to 4700 g of the emulsion obtained in Section III.1.2.2. At 65° C., 2459 g of butyl acrylate and 50 g of DCPA were added in the course of 3.5 hours and stirring was then carried out for a further 2 hours at 65° C. The average particle diameter ($d_{50}$) of the grafting base MI.2.1, the first graft layer MI.2.2 and the second graft layer MI.2.3 together was 447 nm. The emulsion obtained had a solids content of 38.5%.

III.1.2.4 Preparation of the Third Graft Layer MI.2.4

5000 g of the emulsion obtained in Section 3 were diluted with 2400 g of water, and 5 g of the sodium salt of a $C_{12}$- to $C_{18}$-paraffinsulfonic acid and 3.5 g of potassium peroxodisulfate were added. At 65° C., a mixture of 675 g of styrene and 225 g of acrylonitrile was added dropwise in the course of 2 hours and stirring was carried out for a further 2 hours at 65° C.

The average particle diameter ($d_{50}$) of the grafting base MI.2.1 and the three graft layers MI.2.2 to MI.2.4 together was 535 nm. The emulsion obtained had a solids content of 38.9%.

III.2 Preparation of the Graft Copolymer Blend MII
(NAE 564/95)

III.2.1 Preparation of the Graft Copolymer MII.1

III.2.1.1 Preparation of the Grafting Base MII.1.1

The monomer mixture comprising 2.3 g of DCPA and 156.8 g of n-butyl acrylate in 1500 g of water was heated to 65° C. while stirring, with the addition of 10 g of the potassium salt of a $C_{12}$-to $C_{18}$-paraffinsulfonic acid, 3 g of potassium peroxodisulfate, 3 g of sodium bicarbonate and 1.5 g of sodium pyrophosphate. 10 minutes after initiation of the polymerization reaction, a mixture of a further 16.8 g of DCPA and 823.2 g of n-butyl acrylate was metered in over 3 hours. After the end of the monomer addition, the emulsion was kept at 65° C. for a further hour. 12.5 g of the resulting latex together with 1500 g of water were heated to 65° C. while stirring, with the addition of 3 g of potassium peroxodisulfate, 3 g of sodium bicarbonate and 1.5 g of sodium pyrophosphate. A mixture of 20 g of DCPA and 980 g of n-butyl acrylate and 3 g of the potassium salt of a $C_{12}$- to $C_{18}$-paraffinsulfonic acid was metered in over 3 hours. After the end of the monomer addition, the emulsion was kept at 65° C. for a further hour.

III.2.1.2 Preparation of the Graft Layers MII.1.2 and MII.1.3

2100 g of an emulsion of the graft layer MII.1.1, which emulsion was prepared by the above method, were mixed with 1150 g of water and 2.7 g of potassium peroxodisulfate and heated to 65° C. while stirring. After the reaction temperature had been reached, a monomer mixture comprising 165 g of styrene and 0.1 g of the potassium salt of a $C_{12}$- to $C_{18}$-paraffinsulfonic acid was metered in over 1 hour. After the end of the addition, a mixture of 372 g of styrene and 124 g of acrylonitrile was metered in. After the end of the addition, the emulsion was kept at 65° C. for a further 2 hours.

The average particle size of the graft copolymers was 510 nm.

II.2.2 Preparation of the Graft Copolymer MII.2

The preparation of the graft copolymer MII.2 corresponds to that of the graft copolymer MI.2.

III.3 Graft Copolymer Blend MIII
(NAE 577/95)

III.3.1 Preparation of the Graft Copolymer MIII.1

III.3.1.1 Preparation of the Grafting Base MIII.1.1

The monomer mixture comprising 3.2 g of DCPA and 156.8 g of n-butyl acrylate in 1500 g of water was heated to 65° C. while stirring, with the addition of 10 g of the potassium salt of a $C_{12}$- to $C_{18}$-paraffinsulfonic acid, 3 g of potassium peroxodisulfate, 3 g of sodium bicarbonate and 1.5 g of sodium pyrophosphate. 10 minutes after initiation of the polymerization reaction, a mixture of a further 16.8 g of DCPA and 823.2 g of n-butyl acrylate was metered in over 3 hours. After the end of the monomer addition, the emulsion was kept at 65° C. for a further hour.

III.3.1.2 Preparation of the Grafting Base MIII.1.2

2100 g of the emulsion prepared by the above method and containing the grafting base MIII.1.1 were mixed with 1150 g of water and 2.7 g of potassium peroxodisulfate and heated to 65° C. while stirring. After the reaction temperature had been reached, a mixture of 495 g of styrene and 165 g of acrylonitrile was metered in over 2 hours. After the end of the addition, the emulsion was kept at 65° C. for a further 2 hours.

The average particle size ($d_{50}$) of the graft copolymers MIII.1 was 97 nm.

III.3.2 Preparation of the Graft Copolymer MIII.2

The preparation of the graft copolymer MIII.2 corresponds to the preparation of the graft copolymer MI.2.

III.4 Graft Copolymer Blend MIV
(NAE 565/95)

III.4.1 Preparation of the Graft Copolymer MIV.1

III.4.1.1 Preparation of the Grafting Base MIV.1.1

4500 g of water, 30 g of the sodium salt of a $C_{12}$- to $C_{18}$-paraffinsulfonic acid, 9 g of potassium peroxodisulfate, 12 g of sodium bicarbonate and 1 g of sodium pyrophosphate were heated to 70° C. while stirring and under nitrogen. A mixture of 2940 g of styrene and 40 g of DCPA was added in the course of 3 hours. After the end of the monomer addition, the emulsion was kept at 60° C. for a further hour.

The seed latex thus obtained had an average particle size ($d_{50}$) of 80 nm. The solids content of the seed latex emulsion was 39.9%.

4200 g of water, 3 g of the sodium salt of a $C_{12}$- to $C_{18}$-paraffinsulfonic acid, 1.75 g of potassium peroxodisulfate, 2.5 g of sodium bicarbonate, 1 g of sodium pyrophosphate and 40 g of the previously prepared seed latex were heated to 65° C. Thereafter, a mixture of 475 g of styrene, 10 g of DCPA and 15 g of BDA was added in the course of 1 hour. After the end of the monomer addition, the emulsion was kept at 65° C. for a further hour. The grafting base MIV.1.1 had an average particle diameter ($d_{50}$) of 250 nm.

The emulsion had a solids content of 8.8%.

III.4.1.2 Preparation of the First Graft Layer MIV.1.2

20 g of the sodium salt of a $C_{12}$- to $C_{18}$-paraffinsulfonic acid, 7.5 g of potassium peroxodisulfate, 10 g of sodium bicarbonate and 2 g of sodium pyrophosphate were added to 4700 g of the emulsion of the grafting base. At 65° C., 2459 g of butyl acrylate and 50 g of DCPA were added in the course of 3.5 hours and stirring was then carried out for a further 2 hours at 65° C.

The grafting base MIV.1.1 and the first graft layer MIV.1.2 together had an average particle diameter ($d_{50}$) of 450 nm. The emulsion had a solids content of 38.6%.

III.4.1.3 Preparation of the Second Graft Layer MIV.1.3

5000 g of the emulsion thus obtained were diluted with 2400 g of water, and 5 g of the sodium salt of a $C_{12}$- to $C_{18}$-paraffinsulfonic acid and 3.5 g of potassium peroxodisulfate were added. At 65° C., a mixture of 675 g of styrene and 225 g of acrylonitrile was added dropwise in the course of 2 hours and stirring was carried out for a further 2 hours at 65° C.

The grafting base MIV.1.1 and the two graft layers MIV.1.2 and MIV.1.3 together had an average particle diameter ($d_{50}$) of 450 nm.

The emulsion had a solids content of 38.8%.

III.4.2. Preparation of the Graft Copolymer MIV.2

III.4.2.1 Preparation of the Grafting Base MIV.2.1

The monomer mixture comprising 3.2 g of DCPA and 156 g of n-butyl acrylate in 1500 g of water was heated to 65° C. while stirring, with the addition of 10 g of the potassium salt of a $C_{12}$- to $C_{18}$-paraffinsulfonic acid, 3 g of potassium peroxodisulfate, 3 g of sodium bicarbonate and 1.5 g of sodium pyrophosphate. 10 minutes after initiation of the polymerization reaction, a mixture of a further 16.8 g of DCPA and 823.2 g of n-butyl acrylate was metered in over 3 hours. After the end of the monomer addition, the emulsion was kept at 65° C. for a further hour.

12.5 g of the latex thus obtained together with 1500 g of water were heated to 65° C. while stirring, with the addition of 3 g of potassium peroxodisulfate, 3 g of sodium bicarbonate and 1.5 g of sodium pyrophosphate. A mixture of 20 g of DCPA and 980 g of n-butyl acrylate and 3 g of the potassium salt of a $C_{12}$- to $C_{18}$-paraffinsulfonic acid was metered in over 3 hours. After the end of the monomer addition, the emulsion was kept at 65° C. for a further hour.

III.4.2.2 Preparation of the First Graft Layer MIV.2.2

2100 g of the emulsion prepared by the above method were mixed with 1150 g of water and 2.7 g of potassium peroxodisulfate and heated to 65° C. while stirring. After the reaction temperature had been reached, a monomer mixture comprising 165 g of styrene and 0.1 g of the potassium salt of a $C_{12}$- to $C_{18}$-paraffinsulfonic acid was metered in over 1 hour. After the end of the addition, a mixture of 372 g of styrene and 124 g of acrylonitrile was metered in. After the end of the addition, the emulsion was kept at 65° C. for a further 2 hours.

The average particle size ($d_{50}$) of the graft copolymers was 510 nm.

III.5 Graft Copolymer Blend MV

III.5.1 Preparation of the Graft Copolymer MV.1

The graft copolymer MV.1 was prepared in the same way as the graft copolymer MI.1.

III.5.2 Preparation of a Copolymer MV.2

III.5.2.1 Preparation of the Grafting Base MV.2.1

4500 g of water, 30 g of the sodium salt of a $C_{12}$- to $C_{18}$-paraffinsulfonic acid, 9 g of potassium peroxodisulfate, 12 g of sodium bicarbonate and 1 g of sodium pyrophosphate were heated to 70° C. while stirring and under nitrogen. A mixture of 2940 g of styrene and 40 g of DCPA was added in the course of 3 hours. After the end of the monomer addition, the emulsion was kept at 60° C. for a further hour.

The average particle diameter ($d_{50}$) was 80 nm. The emulsion had a solids content of 39.9%.

4200 g of water, 3 g of the sodium salt of a $C_{12}$- to $C_{18}$-paraffinsulfonic acid, 1.75 g of potassium peroxodisulfate, 2.5 g of sodium bicarbonate, 1 g of sodium pyrophosphate and 40 g of the previously prepared PS seed latex were heated to 65° C. Thereafter, a mixture of 475 g of styrene, 10 g of DCPA and 15 g of BDA was added in the course of 3 hours. After the end of the monomer addition, the emulsion was kept at 65° C. for a further hour. The grafting base MV.2.1 had an average particle diameter ($d_{50}$) of 250 nm.

The emulsion had a solids content of 10.5%.

III.5.2.2 Preparation of the First Graft Layer MV.2.2

20 g of the sodium salt of a $C_{12}$- to $C_{18}$-paraffinsulfonic acid, 7.5 g of potassium peroxodisulfate, 10 g of sodium bicarbonate and 2 g of sodium pyrophosphate were added to 4700 g of the emulsion obtained in Section III.5.2.1. At 65° C., 2459 g of butyl acrylate and 50 g of DCPA were added in the course of 3.5 hours and stirring was then carried out for a further 2 hours at 65° C. The average particle size ($d_{50}$) of the graft copolymer was 450 nm. The emulsion had a solids content of 38.6%.

III.5.2.3 Preparation of the Second Graft Layer MV.2.3

5000 g of the emulsion obtained under III.5.2.2 were diluted with 2400 g of water, and 5 g of the sodium salt of a $C_{12}$- to $C_{18}$-paraffinsulfonic acid and 3.5 g of potassium peroxodisulfate were added. At 65° C., a mixture of 675 g of styrene and 225 g of acrylonitrile was added dropwise in the course of 2 hours and stirring was carried out for a further 2 hours at 65° C.

The average particle size ($d_{50}$) of the graft copolymers was 540 nm.

The emulsion had a solids content of 38.8%.

III.6 Working up the Graft Copolymers

The graft copolymers were precipitated from the emulsion by means of a calcium chloride solution at 95° C., washed with water and dried in a warm air stream.

III.7 Blending Experiments

For the preparation of the blend, a styrene/acrylonitrile copolymer having an acrylonitrile content of 34% and a viscosity number of 78 ml/g (the viscosity numbers were determined in a 0.5% strength solution in dimethylformamide at 23° C.) was used as component iii. The precipitated and dried graft copolymers described under III. were each mixed with component iii at 260° C. in an extruder. Shaped articles were produced from this blend and their colorability, gloss and notched impact strength were determined by the measuring methods described above.

Table III.1 below shows the respective amounts of the graft copolymers described under III and of the styrene/acrylonitrile copolymer (component iii) in the thermoplastic materials obtained by blending experiments.

TABLE III.1

| Blend | Components [% by weight] | | |
|---|---|---|---|
| | i | ii | iii |
| MI | 18 MI.1 | 12 MI.2 | 70 |
| MII | 18 MII.1 | 18 MII.2 | 70 |
| MIII | 18 MIII.1 | 12 MIII.2 | 70 |
| MIV | 18 MIV.1 | 12 MIV.2 | 70 |
| MV | 18 MV.1 | 12 MV.2 | 70 |

Table III.2 below shows the notched impact strength $a_k$, the impact strengths $a_n$, the colorability ($\Delta E$) and the gloss for each of the blends.

TABLE III.2

| | MI | MII | MIII | MIV | MV |
|---|---|---|---|---|---|
| Notched impact strength[a) $a_k$ [220° C./23° C.] | 11.2 | 11.5 | 10.5 | 11.1 | 10.8 |
| Notched impact strength[a) $a_k$ [280° C./23° C.] | 11.0 | 11.7 | 8.8 | 11.3 | 11.3 |

TABLE III.2-continued

|  | MI | MII | MIII | MIV | MV |
|---|---|---|---|---|---|
| Impact strength[b] $a_n$ [220° C./−30° C.] | 162 | 200 | 130 | 190 | 165 |
| Impact strength[b] $a_n$ [280° C./−30° C.] | 160 | 192 | 145 | 198 | 168 |
| Colorability [ΔE][c] | 10.5 | 9.9 | 9.5 | 10.0 | 10.7 |
| Gloss [%][d] | 68 | 68 | 62 | 64 | 68 |

[a] in kJ/m², according to ISO 170/1eA
[b] in kJ/m², according to ISO 170/1eU
[c] according to DIN 6174
[d] according to DIN 67530

What is claimed is:

1. A graft copolymer (P1) containing, in any desired sequence, at least
    P1.1) a hard segment having a glass transition temperature of at least 11° C., which contains at least one vinylaromatic monomer as the monomer or as one of two or more monomers copolymerizable with one another and a crosslinker component comprising
        at least dihydrodicyclopentadienyl acrylate as a crosslinking agent having two or more functional groups of different reactivity and
        at least one crosslinking agent having two or more functional groups of the same reactivity (P1.1) and
    P1.2) a soft segment having a glass transition temperature of not more than 10° C., which contains at least one acrylate as the monomer or as one of two or more monomers copolymerizable with one another (P1.2).

2. A graft copolymer P1 as claimed in claim 1 wherein the hard segment P1.1 contains at least divinylbenzene or butanediol diacrylate as the crosslinking agent having two or more functional groups of the same reactivity.

3. A graft copolymer (P1) containing, in any desired sequence, at least
    P1.1) a hard segment having a glass transition temperature of at least 11° C., which contains at least one vinylaromatic monomer as the monomer or as one of two or more monomers copolymerizable with one another and a crosslinker component comprising
        at least dihydrodicyclopentadienyl acrylate as a crosslinking agent having two or more functional groups of different reactivity and
        at least one crosslinking agent having two or more functional groups of the same reactivity (P1.1) and
    P1.2) a soft segment having a glass transition temperature of not more than 10° C., which contains at least one acrylate as the monomer or is one of two or more monomers copolymerizable with one another (P1.2), said graft copolymer P1, containing at least
    P1.1) from 1 to 95% by weight of a hard segment having a glass transition temperature of at least 25° C., which contains
        P1.1.1) from 50 to 99.8% by weight of at least one vinylaromatic monomer (P1.1.1),
        P1.1.2) from 0 to 49.8 % by weight of at least one monomer (P1.1.2) copolymerizable with the monomers P1.1.1,
        P1.1.3) from 0.1 to 25% by weight of the crosslinker component containing
            α) from 0.1 to 100% by weight of dihydrodicyclopentadienyl acrylate (α) and
            β) from 0 to 99.9% by weight of at least one further crosslinking agent having two or more functional groups of different reactivity (β), the sum of the percentages by weight of α and β being 100 (P1.1.3), and
        P1.1.4) from 0.1 to 25% by weight of at least one crosslinking agent having two or more functional groups of the same reactivity (P1.1.4), the sum of the percentages by weight of P1.1.1 to P1.1.4 being 100, and
    P1.2) from 5 to 99% by weight of at least one soft segment having a glass transition temperature of not more than 0° C., which contains
        P1.2.1) from 30 to 100% by weight of at least one acrylate (P1.2.1),
        P1.2.2) from 0 to 50% by weight of at least one monomer (P1.2.2) copolymerizable with the monomers P1.2.1 and
        P1.2.3) from 0 to 20% by weight of at least one crosslinking agent (P1.2.3),
        the sum of the percentages by weight of P1.2.1 to P1.2.3 or P1.1 and P1.2 being 100.

4. A graft copolymer P1 as claimed in claim 3, wherein the hard segment P1.1 contains at least divinylbenzene or butanediol diacrylate as the crosslinking agent having two or more functional groups of the same reactivity.

5. A process for the preparation of the graft copolymer of claim 1, P1 containing, in any desired sequence, at least
    P1.1) a hard segment having a glass transition temperature of at least 11° C. which contains at least one vinylaromatic monomer as the monomer or as one of two or more monomers copolymerizable with one another and a crosslinker component comprising
        at least dihydrodicyclopentadienyl acrylate as a crosslinking agent having two or more functional groups of different reactivity and
        at least one crosslinking agent having two or more functional groups of the same reactivity (P1.1) and
    P1.2) a soft segment having a glass transition temperature of not more than 10° C., which contains at least one acrylate as the monomer or as one of two or more monomers copolymerizable with one another (P1.2), wherein the monomers and crosslinking agents forming the segments of the graft copolymer P1 are polymerized in an emulsion in the in the presence of at least one emulsifier at from 20 to 100° C.

6. A process as claimed in claim 5, wherein the ratio of the feed rates of monomers and crosslinking agents P1.1.1 to P1.1.4 to those of the monomers and crosslinking agents P1.2.1 to P1.2.3 and the ratio of the feed rates of the emulsifiers for a hard segment P1.1 to those for a soft segment P1.2 are each, independently of one another, from 0.05 to 20.

7. A process for preparation of the graft copolymer, P1 of claim 3 containing at least
    P1.1) front 1 to 95 % by weight of a hard segment having a glass transition temperature of at least 25° C., which contains
        P1.1.1) from 50 to 99.8% by weight of at least one vinylaromatic monomer (P1.1.1),
        P1.1.2) from 0 to 49.8% by weight of at least one monomer (P1.1.2) copolymerizable With the monomers P1.1.1,
        P1.1.3) from 0.1 to 25% by weight, of the crosslinker component containing
            α) from 0.1 to 100% by weight of dihydrodicyclopentadienyl acrylate (α) and
            β) from 0 to 99.9% by weight of at least one further crosslinking agent having two or more functional groups of different reactivity (β), the sum of the percentages by weight of α and β being 100 (P1.1.3), and P1.1.4) from 0.1 to 25% by weight of at least one crosslinking agent having two or more functional groups of the same reactivity (P1.1.4), the sum of the percentages by weight of P1.1.1 to P1.1.4 being 100, and P1.2) from 5 to 99% by weight of at least one soft segment having a glass transition temperature of not more than 0° C., which contains P1.2.1) from 30 to 100% by weight of at least one acrylate (P1.2.1), P1.2.2) from 0 to 50% by weight of at least one monomer (P1.2.2) copolymerizable with the monomers P1.2.1 and P1.2.3) from 0 to 20% by weight of at least one crosslinking agent (P1.2.3), the sum of the percentages by weight of P1.2.1 to P1.2.3 or P1.1 and P1.2 being 100, wherein the monomers and crosslinking agents forming the segments of the graft copolymer P1 are polymerized in an emulsion in the presence of at least one emulsifier at from 20 to 100° C.

8. A process as claimed in claim 7, wherein the ratio of the feed rates of monomers and crosslinking agents P1.1.1 to P1.1.4 to those of the monomers and crosslinking agents P1.2.1 to P1.2.3 and the ratio of the feed rates of the emulsifiers for a hard segment P1.1 to those for a soft segment P1.2 are each, independently of one another, from 0.05 to 20.

9. A graft copolymer (P2) containing, in any desired sequence, at least

P2.1) a hard segment having a glass transition temperature of at least 11° C., which contains at least one vinylaromatic monomer as the monomer or as one of two or more monomers copolymerizable with one another and a crosslinker component comprising at least dihydrodicyclopentadienyl acrylate as a crosslinking agent having two or more functional groups of differently reactivity and at least one crosslinking agent having two or more functional groups of the same reactivity (P2.1) and P2.2) a soft segment having a glass transition temperature of not more than 10° C., which contains at least one acrylate as the monomer or as one of two or more monomers copolymerizable with one another (P2.2) and P2.3) from 0.1 to 94% by weight of at least one additional segment (P2.3), the sum of the segments P2.1 to P2.3 being 100.

10. A graft copolymer P2 as claimed in claim 9, wherein P2.3 contains, in any desired sequence, a polymer composition P2.3.1 containing at least P2.3.1.1) from 30 to 99.9% by weight of at least one vinylaroniatic monomer, P2.3.1.2) from 0 to 50% by weight of at least one monomer copolymerizable with P2.3.1.1 and P2.3.1.3) from 0.1 to 20% by weight of a crosslinking agent or a second polymer composition P2.3.2 containing P2.3.2.1) from 50 to 100% by weight of at least one vinylaromatic monomer and P2.3.2.2) from 0 to 50% by weight of at least one monomer copolymerizable with P2.3.2.1, the sum of the percentages by weight of P2.3.1.1 to P2.3.1.3 and of P2.3.2.1 and P2.3.2.2 each being 100.

11. A graft copolymer (P3) containing at least

P3.1) a soft segment having a glass transition temperature of not more than 0° C. and comprising at least one acrylate and at least one crosslinking agent, as the grafting base, and P3.2) a graft copolymer P1 or P2, as the graft layer, wherein P1 is a graft copolymer containing, in any desired sequence, at least P1.1) a hard segment having a glass transition temperature of ate least 11° C., which contains at least one vinylaromatic monomer as the monomer or as one of two or more monomers copolymerizable with one another and a crosslinker component comprising at least dihydrodicyclopentadienyl acrylate as a crosslinking agent having two or more functional groups or different reactivity and at least one crosslinking agent having two or more functional groups of the same reactivity (P1.1) and P1.2) a soft segment having a glass transition temperature of not more than 10° C., which contains at least one acrylate as the monomer or as one of two or more monomers copolymerizable with one another (P1.2), and P2 is a graft copolymer containing, in any desired sequence, at least P2.1) a hard segment having a glass transition temperature of at least 11° C., which contains at least one vinylaromatic monomer as the monomer or as one of two or more monomers copolymerizable with one another and a crosslinker component comprising at least dihydrodicyclopentadienyl acrylate as a crosslinking agent having two or more functional groups of different reactivity and at least one crosslinking agent having two or more functional groups of the same reactivity (P2.1) and P2.2) a soft segment having a glass transition temperature of not more than 10° C., which contains at least one acrylate as the monomer or as one of two or more monomers copolymerizable with one another (P2.2) and P2.3) from 0.1 to 94% by weight of at least one additional segment (P2.3), the sum of the segments P2.1 to P2.3 being 100.

12. A graft copolymer P3 as claimed in claim 11, wherein the soft segment P3.1 contains at least P3.1.1) from 30 to 99.9% by weight of at least one acrylate, P3.1.2) from 0 to 50% by weight of at least one monomer copolymerizable with the monomers P3.1.1 and P3.1.3) from 0.1 to 20% by weight of at least one crosslinking agent, the sum of the percentages by weight of P3.1.1 to P3.1.3 being 100.

13. A process for the preparation of a graft copolymer P3 as claimed in claim 11, wherein the monomers and crosslinking agents forming the segments of the graft copolymer P3 are polymerized in an emulsion, when a soft segment follows a hard segment the ratio of the feed rates of the monomers and crosslinking agents forming a hard segment to the monomers and crosslinking agents forming a soft segment and the ratio of the feed rates of the emulsifiers for this hard segment to those for this soft segment each being, independently of one another, from 0.05 to 20.

14. A process for the preparation of a graft copolymer P3 as claimed in claim 11, wherein the monomers and crosslinking agents forming the segments of the graft copolymer P3 are polymerized in an emulsion, when a soft segment follows a hard segment the ratio of the feed rates of the monomers and crosslinking agents forming a hard segment to the monomers and crosslinking agents forming a soft segment and the ratio of the feed rates of the emulsifiers for this hard segment to those for this soft segment each being, independently of one another, from 0.05 to 20 wherein the polymerization is carried out at from 20 to 100° C.

15. Graft copolymer-containing blends or thermoplastic materials containing one or more copolymers P1, P2 and P3 wherein P1 is a graft copolymer containing, in any desired sequence, at least
- P1.1) a hard segment having a glass transition temperature of at least 11° C., which contains at least one vinylaromatic monomer as the monomer or as one of two or more monomers copolymerizable with one another and a crosslinker component comprising
  - at least dihydrodicyclopentadienyl acrylate as a crosslinking agent having two or more functional groups of different reactivity and
  - at least one crosslinking agent having two or more functional groups of the same reactivity (P1.1) and
- P1.2) a soft segment having a glass transition temperature of not more than 10° C., which contains at least one acrylate as the monomer or as one of two or more monomers copolymerizable with one another (P1.2), P2 is a graft copolymer containing, in any desired sequence, at least
- P2.1) a hard segment having a glass transition temperature of at least 11° C., which contains at least one vinylaromatic monomer as the monomer or as one of two or more monomers copolymerizable with one another and a crosslinker component comprising
  - at least dihydrodicyclopentadienyl acrylate as a crosslinking agent having two or more functional groups of different reactivity and
  - at least one crosslinking agent having two or more functional groups of the same reactivity (P2.1) and
- P2.2 a soft segment having a glass transition temperature of not more than 10° C., which contains at least one acrylate as the monomer or as one of two or more monomers copolymerizable with one another (P2.2) and
- P2.3 from 0.1 to 94% by weight of at least additional segment (P2.3), the sum of the segments P2.1 to P2.3 being 100, and P3 is a graft copolymer containing at least
  - P3.1) a soft segment having a glass transition temperature of not more than 0° C. and comprising at least one acrylate and at least one crosslinking agent as the grafting base, and
  - P3.2) said graft copolymer P1 or P2, as the graft layer.

16. A blend (M1) containing at least one
- M1) graft copolymer (P4) which contains
  - P4.1) from 0.1 to 90% by weight of at least one elastomeric grafting base P4.1 comprising a soft segment having a glass transition temperature of not more than 0° C. composed of
    - P4.1.1) from 40 to 99.9% by weight of at least one acrylate, diene or dialkylsiloxane,
    - P4.1.2) from 0.1 to 10.1% by weight of at least one crosslinking agent and
    - P4.1.3) from 0 to 49.9% by weight of at least one further monomer P4.1.3 copolymerizable with the monomers P4.1.1, the sum of the percentages by weight of P4.1.1 to P4.1.3 being 100,
  - P4.2) from 5 to 49.9% by weight of at least one hard segment having a glass transition temperature of at least 25° C., as a graft layer, consisting of
    - P4.2.1) from 30 to 100% by weight of at least one vinylaromatic monomer,
    - P4.2.2) from 0 to 20% by weight of at least one crosslinking agent and
    - P4.2.3) from 0 to 50% by weight of at least one further monomer copolymerizable with P4.2.1, the sum of the percentages by weight of P4.2.1 to P4.2.3 being 100, and
  - P4.3) from 5 to 50% by weight of at least one hard segment having a glass transition temperature of at least 25° C., as a graft layer, consisting of
    - P4.3.1) from 0.1 to 99.9% by weight of at least one vinylaromatic monomer and
    - P4.3.2) from 0.1 to 99.9% by weight of at least one monomer copolymerizable with P4.3.1, the sum of the percentages by weight of P4.3.1 and P4.3.2 and the sum of the percentages by weight of P4.1 to P4.3 each being 100, and
- M1.II) at least one graft copolymer P1 of claim 1.

17. A process for the preparation of blend M1 of claim 16, wherein the graft copolymers contained in said blend are mixed with one another in an extruder at from 200 to 300° C. and in an average residence time of from 0.1 to 100 minutes.

18. A thermoplastic material containing at least
- from 0.1 to 95% by weight of at least one graft copolymer P1 of claim 1,
- from 0 to 94.9% by weight of at least one graft copolymer differing from P1,
- from 5 to 99.9% by weight of at least one copolymer of
  - from 50 to 100% by weight of at least one vinylaromatic monomer, $C_1$–$C_8$-alkyl acrylate, $C_1$–$C_{18}$-alkyl methacrylate or a mixture thereof and
  - from 0 to 50% by weight of acrylonitrile, methacrylonitrile, maleic anhydride, an N-substituted maleimide or a mixture thereof
- from 0 to 90% by weight of at least one polycarbonate and
- from 0 to 50% by weight of additives.

19. Moldings, films, fibers or coatings containing at least one graft copolymer P1 of claim 1 or thermoplastic materials containing P1.

20. A blend (M2) containing at least one
- M2.I) graft copolymer(P4)which contains
  - P4.1) from 0.1 to 90% by weight of at least one elastomeric grafting base P4.1 comprising a soft segment having a glass transition temperature of not more than 0° C. composed of
    - P4.1.1) from 40 to 99.9% by weight of at least one acrylate, diene or dialkylsiloxane,
    - P4.1.2) from 0.1 to 10.1% by weight of at least one crosslinking agent and
    - P4.1.3) from 0 to 49.9% by weight of at least one further monomer P4.1.3 copolymerizable with the monomers P4.1.1, the sum of the percentages by weight of P4.1.1 to P4.1.3 being 100,
  - P4.2) from 5 to 49.9% by weight of at least one hard segment having a glass transition temperature of at least 25° C., as a graft layer, consisting of
    - P4.2.1) from 30 to 100% by weight of at least one vinylaromatic monomer,
    - P4.2.2) from 0 to 20% by weight of at least one crosslinking agent and
    - P4.2.3) from 0 to 50% by weight of at least one further monomer copolymerizable with P4.2.1, the sum of the percentages by weight of P4.2.1 to P4.2.3 being 100, and P4.3) from 5 to 50% by weight of at least one hard segment having a glass transition temperature of at least 25° C., as a graft layer, consisting of
 P4.3.1) from 0.1 to 99.9% y weight of at least one vinylaromatic monomer and
 P4.3.2) from 0.1 to 99.9% by weight of at least one monomer copolymerizable with P4.3.1,
the sum of the percentages by weight of P4.3.1 and P4.3.2 and the sum of the percentages by weight of P4.1 to P4.3 each being 100, and
 M2.II) at least one graft copolymer P2 of claim 9.

21. A blend (M3) containing at least one
 M3.I) graft copolymer (P4) which contains
  P4.1) from 0.1 to 90% by weight of at least one elastomeric grafting base P4.1 comprising a soft segment having a glass transition temperature of not more than 0° C. composed of
   P4.1.1) from 40 to 99.9% by weight of at least one acrylate, diene or dialkylsiloxane,
   P4.1.2) from 0.1 to 10.1 % by weight of at least one crosslinking agent and
   P4.1.3) from 0 to 49.9% by weight of at least one further monomer P4.1.3 copolymerizable with the monomers P4.1.1, the sum of the percentages by weight of P4. 1.1 to P4.1.3 being 100,
  P4.2) from 5 to 49.9% by weight of at least one hard segment having a glass transition temperature of at least 25° C., as a graft layer, consisting of
   P4.2.1) from 30 to 100% by weight of at least one vinylaromatic monomer,
   P4.2.2) from 0 to 20% by weight of at least one crosslinking agent and
   P4.2.3) from 0 to 50% by weight of at least one further monomer copolymerizable with P4.2.1, the sum of the percentages by weight of P4.2.1 to P4.2.3 being 100, and
  P4.3) from 5 to 50% by weight of at least one hard segment having a glass transition temperature of at least 25° C., as a graft layer, consisting of
   P4.3.1) from 0.1 to 99.9% y weight of at least one vinylaromatic monomer and
   P4.3.2) from 0.1 to 99.9% by weight of at least one monomer copolymerizable with P4.3.1,
the sum of the percentages by weight of P4.3.1 and P4.3.2 and the sum of the percentages by weight of P4.1 to P4.3 each being 100, and
 M3.II) at least one graft copolymer P3 of claim 11.

22. A blend (M4) containing at least one
 M4.I) graft copolymer (P5) which contains
  P5.1) from 30 to 90% by weight of at least one soft segment P4.1 and
  P5.2) from 10 to 70% by weight of at least one hard segment P4.3, the sum of the percentages by weight of P5.1 and P5.2 being 100, and at least one
 M4.II) graft copolymer P1 of claim 1.

23. A blend (M5) containing at least one
 M5.I) graft copolymer (P5) which contains
  P5.1) from 30 to 90% by weight of at least one soft segment P4.1 and
  P5.2) from 10 to 70% by weight of at least one hard segment P4.3, the sum of the percentages by weight of P5.1 and P5.2 being 100, and at least one
 M5.II) graft copolymer P2 of claim 9.

24. A blend (M6) containing at least one
 M6.I) graft copolymer (P5) which contains
  P5.1) from 30 to 90% by weight of at least one soft segment P4.1 and
  P5.2) from 10 to 70% by weight of at least one hard segment P4.3, the sum of the percentages by weight of P5.1 and P5.2 being 100, and at least one
 M6.II) graft copolymer P3 of claim 11.

25. A thermoplastic material containing at least
from 0.1 to 95% by weight of at least one graft copolymer P2 of claim 9, from 0 to 94.9% by weight of at least one graft copolymer or blend differing from P2,
from 5 to 99.9% by weight of at least one copolymer of
from 50 to 100% by weight of at least one vinylaromatic monomer, $C_1$–$C_8$-alkyl acrylate, $C_1$–$C_{18}$-alkyl methacrylate or a mixture thereof and
from 0 to 50% by weight of acrylonitrile, methacrylonitrile, maleic anhydride, an N-substituted maleimide or a mixture thereof,
from 0 to 90% by weight of at least one polycarbonate and
from 0 to 50% by weight of additives.

26. A thermoplastic material containing at least
from 0.1 to 95% by weight of at least one graft copolymer P3 of claim 11,
from 0 to 94.9% by weight of at least one graft copolymer differing from P3,
from 5 to 99.9% by weight of at least one copolymer of
from 50 to 100% by weight of at least one vinylaromatic monomer, $C_1$–$C_8$-alkyl acrylate, $C_1$–$C_{18}$-alkyl methacrylate or a mixture thereof and
from 0 to 50% by weight of acrylonitrile, methacrylonitrile, maleic anhydride, an N-substituted maleimide or a mixture thereof,
from 0 to 90% by weight of at least one polycarbonate and
from 0 to 50% by weight of additives.

27. A thermoplastic material containing at least
from 0.1 to 95% by weight of at least one blend M1 of claim 16,
from 0 to 94.9% by weight of at least one graft copolymer or blend differing from P4,
from 5 to 99.9% by weight of at least one copolymer of
from 50 to 100% by weight of at least one vinylaromatic monomer, $C_1$–$C_8$-alkyl acrylate, $C_1$–$C_{18}$-alkyl methacrylate or a mixture thereof and
from 0 to 50% by weight of acrylonitrile, methacrylonitrile, maleic anhydride, an N-substituted maleimide or a mixture thereof,
from 0 to 90% by weight of at least one polycarbonate and
from 0 to 50% by weight of additives.

28. A thermoplastic material containing at least
from 0.1 to 95% by weight of at least one blend M2 of claim 20,
from 0 to 94.9% by weight of at least one graft copolymer or blend differing from P4,
from 5 to 99.9% by weight of at least one copolymer of
from 50 to 100% by weight of at least one vinylaromatic monomer, $C_1$–$C_8$-alkyl acrylate, $C_1$–$C_{18}$-alkyl methacrylate or a mixture thereof and
from 0 to 50% by weight of acrylonitrile, methacrylonitrile, maleic anhydride, an N-substituted maleimide or a mixture thereof,
from 0 to 90% by weight of at least one polycarbonate and
from 0 to 50% by weight of additives.

29. A thermoplastic material containing at least
from 0.1 to 95% by weight of at least one blend M3 of claim 21, from 0 to 94.9% by weight of at least one graft copolymer or blend differing from P4, from 5 to 99.9% by weight of at least one copolymer of from 50 to 100% by weight of at least one vinylaromatic monomer, $C_1$–$C_8$-alkyl acrylate, $C_1$–$C_{18}$-alkyl methacrylate or a mixture thereof and from 0 to 50% by weight of acrylonitrile, methacrylonitrile, maleic anhydride, an N-substituted maleimide or a mixture thereof, from 0 to 90% by weight of at least one polycarbonate and from 0 to 50% by weight of additives.

30. A thermoplastic material containing at least from 0.1 to 95% by weight of at least one blend M4 of claim 22, from 0 to 94.9% by weight of at least one graft copolymer or blend differing from P5, from 5 to 99.9% by weight of at least one copolymer of from 50 to 100% by weight of at least one vinylaromatic monomer, $C_1$–$C_8$-alkyl acrylate, $C_1$–$C_{18}$-alkyl methacrylate or a mixture thereof and from 0 to 50% by weight of acrylonitrile, methacrylonitrile, maleic anhydride, an N-substituted maleimide or a mixture thereof, from 0 to 90% by weight of at least one polycarbonate and from 0 to 50% by weight of additives.

31. A thermoplastic material containing at least from 0.1 to 95% by weight of at least one blend M5 of claim 23, from 0 to 94.9% by weight of at least one graft copolymer or blend differing from P5, from 5 to 99.9% by weight of at least one copolymer of from 50 to 100% by weight of at least one vinylaromatic monomer, $C_1$–$C_8$-alkyl acrylate, $C_1$–$C_{18}$-alkyl methacrylate or a mixture thereof and from 0 to 50% by weight of acrylonitrile, methacrylonitrile, maleic anhydride, an N-substituted maleimide or a mixture thereof, from 0 to 90% by weight of at least one polycarbonate and from 0 to 50% by weight of additives.

32. A thermoplastic material containing at least from 0.1 to 95% by weight of at least one blend M6 of claim 24, from 0 to 94.9% by weight of at least one graft copolymer or blend differing from P5, from 5 to 99.9% by weight of at least one copolymer of from 50 to 100% by weight of at least one vinylaromatic monomer, $C_1$–$C_8$-alkyl acrylate, $C_1$–$C_{18}$-alkyl methacrylate or a mixture thereof and from 0 to 50% by weight of acrylonitrile, methacrylonitrile, maleic anhydride, an N-substituted maleimide or a mixture thereof, from 0 to 90% by weight of at least one polycarbonate and from 0 to 50% by weight of additives.

33. Moldings, films, fibers or coatings containing at least one graft copolymer P2 of claim 7.

34. Moldings, films, fibers or coatings containing at least one graft copolymer P3 of claim 8.

35. Moldings, films, fibers or coatings containing at least one blend M1 of claim 16.

36. Moldings, films, fibers or coatings containing at least one blend M2 of claim 20.

37. Moldings, films, fibers or coatings containing at least one blend M3 of claim 21.

38. Moldings, films, fibers or coatings containing at least one blend M4 of claim 22.

39. Moldings, films, fibers or coatings containing at least one blend M5 of claim 23.

40. Moldings, films, fibers or coatings containing at least one blend M6 of claim 24.

* * * * *

UNITED STATES PATENT AND TRADEMARK OFFICE
CERTIFICATE OF CORRECTION

PATENT NO.: 6,111,012

DATED: August 29, 2000

INVENTOR(S): FISCHER et al.

It is certified that error appears in the above-identified patent and that said Letters Patent is hereby corrected as shown below:

Col. 58, claim 5, line 42, "in the in the" should be --in the--.

Col. 58, claim 7, line 59, "With" should be --with--.

Col. 60, claim 11, line 11, "ate" should be --at--.

Col. 61, claim 16, line 55, "M1)" should be --M1.1--.

Col. 63, claim 20, line 4, "y" should be --by--.

Col. 63, claim 21, line 39, "y" should be --by--.

Signed and Sealed this

Twenty-ninth Day of May, 2001

Attest:

NICHOLAS P. GODICI

*Attesting Officer*       *Acting Director of the United States Patent and Trademark Office*